United States Patent
Cariou et al.

(10) Patent No.: US 11,057,254 B2
(45) Date of Patent: Jul. 6, 2021

(54) CONTROL FIELDS FOR NULL DATA PACKET FEEDBACK REPORTS

(71) Applicant: Intel IP Corporation, Santa Clara, CA (US)

(72) Inventors: Laurent Cariou, Portland, OR (US); Yaron Alpert, Hod Hasharoni (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/474,145

(22) PCT Filed: Oct. 26, 2017

(86) PCT No.: PCT/US2017/058438
§ 371 (c)(1),
(2) Date: Jun. 27, 2019

(87) PCT Pub. No.: WO2018/156211
PCT Pub. Date: Aug. 30, 2018

(65) Prior Publication Data
US 2019/0349232 A1    Nov. 14, 2019

Related U.S. Application Data

(60) Provisional application No. 62/463,985, filed on Feb. 27, 2017, provisional application No. 62/461,643, filed on Feb. 21, 2017.

(51) Int. Cl.
| | | |
|---|---|---|
| *H04L 27/26* | (2006.01) | |
| *H04L 5/00* | (2006.01) | |
| *H04W 80/02* | (2009.01) | |
| *H04W 84/12* | (2009.01) | |
| *H04W 88/10* | (2009.01) | |

(52) U.S. Cl.
CPC ........ *H04L 27/2613* (2013.01); *H04L 5/0053* (2013.01); *H04L 5/0094* (2013.01);
(Continued)

(58) Field of Classification Search
CPC . H04L 27/2613; H04L 5/0053; H04L 5/0094; H04L 5/0048; H04L 5/0005;
(Continued)

(56) References Cited

U.S. PATENT DOCUMENTS

2012/0140753 A1\*  6/2012  Lee .................. H04L 1/1812
                                                          370/338
2016/0173259 A1    6/2016  Lee et al.
(Continued)

FOREIGN PATENT DOCUMENTS

WO    WO-2016167608 A1    10/2016

OTHER PUBLICATIONS

"International Application Serial No. PCT US2017 058438, International Preliminary Report on Patentability dated Sep. 6, 2019", 10 pgs.

(Continued)

*Primary Examiner* — Cadal Elpenord
(74) *Attorney, Agent, or Firm* — Schwegman Lundberg & Woessner, P.A.

(57) ABSTRACT

Apparatuses, computer readable media, and methods for control field for null data packet feedback report trigger are disclosed. A station is disclosed, the station comprising processing circuitry configured to: decode a media access control (MAC) protocol data unit (MPDU) comprising an A-control field of type null data packet (NDP) feedback report poll comprising a feedback type field and an indication of a resource unit (RU). The processing circuitry further configured to determine whether the station is scheduled to respond to the A-control field of type NDP feedback report poll, and if the station is scheduled to respond to the A-control field of type NDP feedback report poll, configure the station to transmit a response to a feedback type indicated by the value of the feedback type field on the RU.

(Continued)

Apparatuses, computer readable media, and methods for short block acknowledgment with NDP are disclosed.

22 Claims, 18 Drawing Sheets

(52) U.S. Cl.
CPC ............ *H04W 80/02* (2013.01); *H04W 84/12* (2013.01); *H04W 88/10* (2013.01)

(58) Field of Classification Search
CPC .... H04L 5/0051; H04W 80/02; H04W 84/12; H04W 88/10
See application file for complete search history.

(56) References Cited

U.S. PATENT DOCUMENTS

| | | | |
|---|---|---|---|
| 2016/0233932 A1* | 8/2016 | Hedayat | ................ H04L 5/0048 |
| 2016/0254884 A1* | 9/2016 | Hedayat | ................ H04B 7/063 370/329 |
| 2016/0262050 A1 | 9/2016 | Merlin et al. | |
| 2017/0070274 A1* | 3/2017 | Lim | ...................... H04B 7/066 |
| 2017/0272138 A1* | 9/2017 | Chun | ...................... H04L 29/08 |
| 2018/0007712 A1* | 1/2018 | Lou | ...................... H04W 74/006 |
| 2018/0205519 A1* | 7/2018 | Vermani | ................. H04L 27/02 |
| 2018/0359761 A1* | 12/2018 | Chun | .................... H04L 5/0094 |

OTHER PUBLICATIONS

"International Application Serial No. PCT/US2017/058438, International Search Report dated Feb. 7, 2018", 3 pgs.

"International Application Serial No. PCT/US2017/058438, Written Opinion dated Feb. 7, 2018", 8 pgs.

Luarent, Cariou, et al., "Explanations for CR on 27.5.2.7 NDP feedback report", IEEE 802.11-17/0074r0, (Jan. 16, 2017).

Luarent, Cariou, et al., "Proposed Text Changes for NDP feedback report", IEEE 802.11-17/073r0, (Jan. 16, 2017), 5-10.

* cited by examiner

|  | 851 | | 850 | | RU |
|---|---|---|---|---|---|
| 802 | 804 | 812 | 810.1 | 810.2 | |
| | SS2 | RB1 | HE-LTF | HE-LTF | 808.1 |
| P-RU1 | SS1 | RB2 | HE-LTF | HE-LTF | 808.2 |
| | SS2 | RB3 | HE-LTF | HE-LTF | 808.3 |
| P-RU2 | SS1 | RB4 | HE-LTF | HE-LTF | 808.4 |
| | SS2 | RB5 | HE-LTF | HE-LTF | |
| P-RU3 | SS1 | RB6 | HE-LTF | HE-LTF | |
| | SS2 | RB7 | HE-LTF | HE-LTF | |
| P-RU4 | SS1 | RB8 | HE-LTF | HE-LTF | |
| | SS2 | RB9 | HE-LTF | HE-LTF | |
| P-RU5 | SS1 | RB10 | HE-LTF | HE-LTF | |
| | SS2 | RB11 | HE-LTF | HE-LTF | |
| P-RU6 | SS1 | RB12 | HE-LTF | HE-LTF | |
| | SS2 | RB13 | HE-LTF | HE-LTF | |
| P-RU7 | SS1 | RB14 | HE-LTF | HE-LTF | |
| | SS2 | RB15 | HE-LTF | HE-LTF | |
| P-RU8 | SS1 | RB16 | HE-LTF | HE-LTF | |
| | SS2 | RB17 | HE-LTF | HE-LTF | |
| P-RU9 | SS1 | RB18 | HE-LTF | HE-LTF | |
| | SS2 | RB19 | HE-LTF | HE-LTF | |
| P-RU10 | SS1 | RB20 | HE-LTF | HE-LTF | |
| | SS2 | RB21 | HE-LTF | HE-LTF | |
| P-RU11 | SS1 | RB22 | HE-LTF | HE-LTF | |
| | SS2 | RB23 | HE-LTF | HE-LTF | |
| P-RU12 | SS1 | RB24 | HE-LTF | HE-LTF | |
| | SS2 | RB25 | HE-LTF | HE-LTF | |
| P-RU13 | SS1 | RB26 | HE-LTF | HE-LTF | |
| | SS2 | RB27 | HE-LTF | HE-LTF | |
| P-RU14 | SS1 | RB28 | HE-LTF | HE-LTF | |
| | SS2 | RB29 | HE-LTF | HE-LTF | |
| P-RU15 | SS1 | RB30 | HE-LTF | HE-LTF | |
| | SS2 | RB31 | HE-LTF | HE-LTF | |
| P-RU16 | SS1 | RB32 | HE-LTF | HE-LTF | |
| | SS2 | RB33 | HE-LTF | HE-LTF | |
| P-RU17 | SS1 | RB34 | HE-LTF | HE-LTF | |
| | SS2 | RB35 | HE-LTF | HE-LTF | |
| P-RU18 | SS1 | RB36 | HE-LTF | HE-LTF | 808.36 |

FREQUENCY 814

FIG. 8

| BITS 1014 | 4 | 12 | 1 | 1 | 2 | 2 | 1 | 3 | 1 |
|---|---|---|---|---|---|---|---|---|---|
| | TRIGGER TYPE | LENGTH | CASCADE INFORMATION | CS REQUIRED | BW | GI AND LTF TYPE | MU-MIMO LTF MODE | NUMBER OF HE-LTF SYMBOLS | STBC |
| | 1002 | 1004 | 1006 | 1008 | 1010 | 1012 | 1014 | 1016 | 1018 |

↙1000

| BITS 1014 | 1 | 6 | 3 | 16 | 1 | 9 | 1 | VARIABLE |
|---|---|---|---|---|---|---|---|---|
| | LDPC EXTRA SYMBOLS SEGMENT | AP TX POWER | PACKET EXTENSION | SPATIAL REUSE | DOPPLER | HE-SIG-A RESERVED | RESERVED | TRIGGER DEPENDENT COMMON INFO |
| | 1020 | 1022 | 1024 | 1026 | 1028 | 1030 | 1032 | 1034 |

FIG. 10

CONTROL FIELDS FOR NULL DATA PACKET FEEDBACK REPORTS

PRIORITY CLAIM

This application is a U.S. National Stage Filing under 35 U.S.C. 371 from International Application No. PCT/US2017/058438, filed Oct. 26, 2017 and published in English as WO 2018/156211 on Aug. 30, 2018, which claims the benefit of priority to U.S. Provisional Patent Application Ser. No. 62/461,643, filed Feb. 21, 2017, and U.S. Provisional Patent Application Ser. No. 62/463,985, filed Feb. 27, 2017, all of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.1 lax. Some embodiments relate to methods, computer readable media, and apparatus for control fields for null data packet (NDP) feedback reports.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 8 illustrates resource units (RUs) for short feedback in accordance with some embodiments:

FIG. 10 illustrates a common information field in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
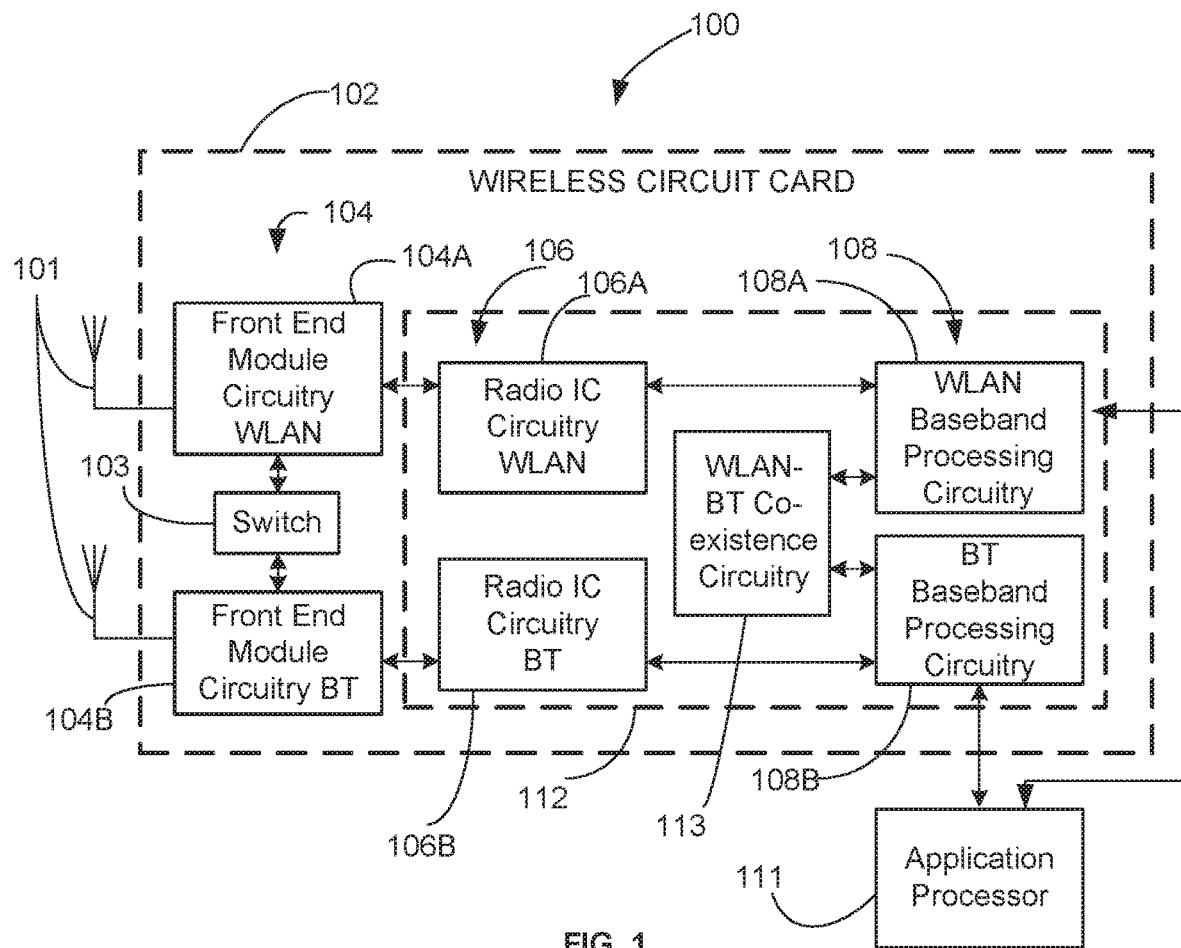
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.1 lax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz. 5 MHz. 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
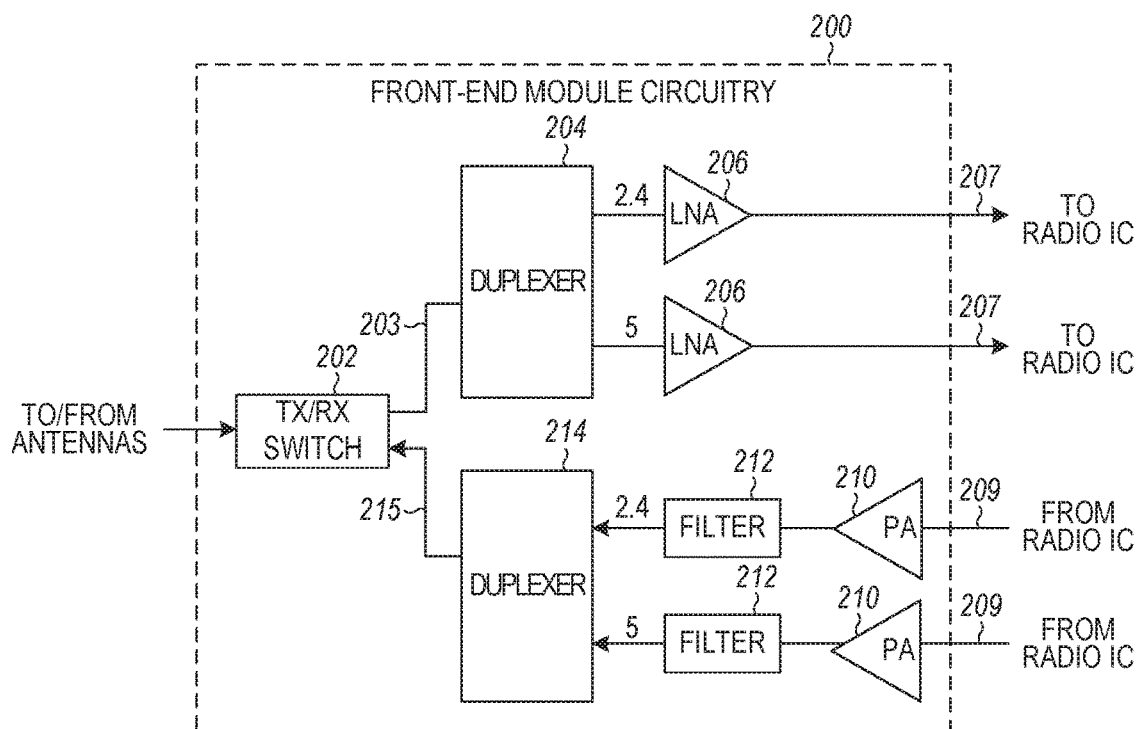
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
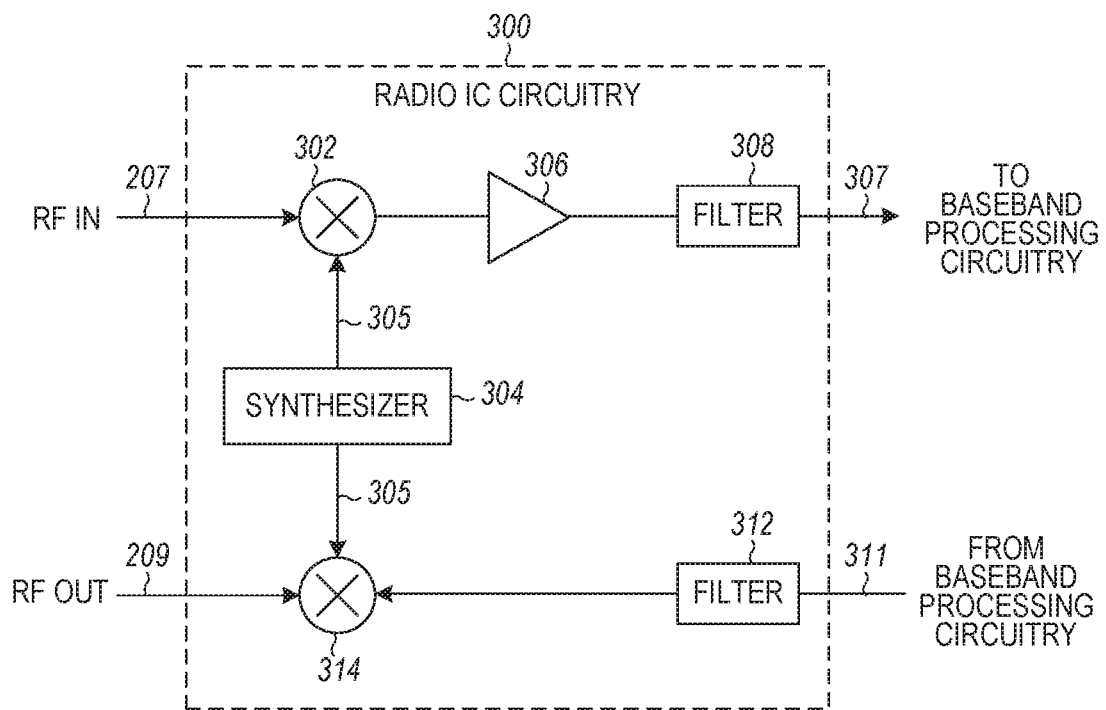
FIG. 3 illustrates a radio integrated circuitry (IC) circuitry for use in the radio architecture of FIG. 1 in accordance with some embodiments.

FIG. 3 illustrates radio integrated circuitry (IC) 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
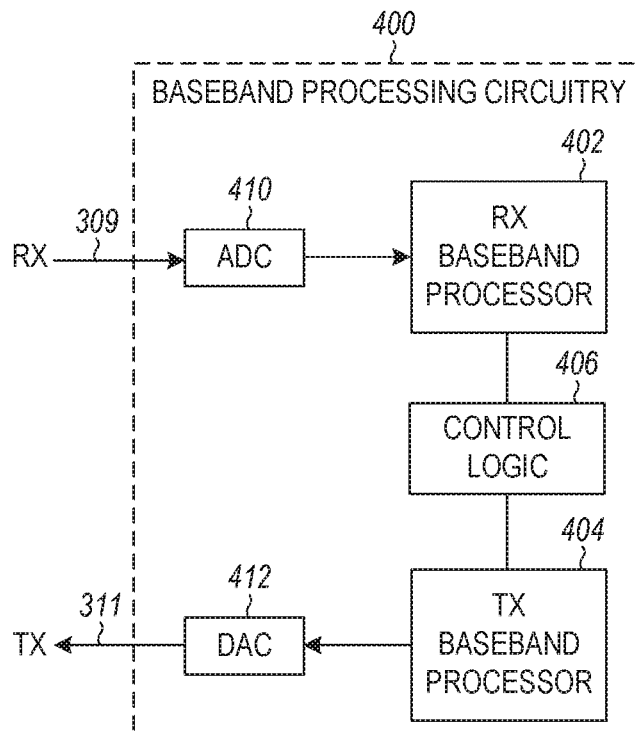
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
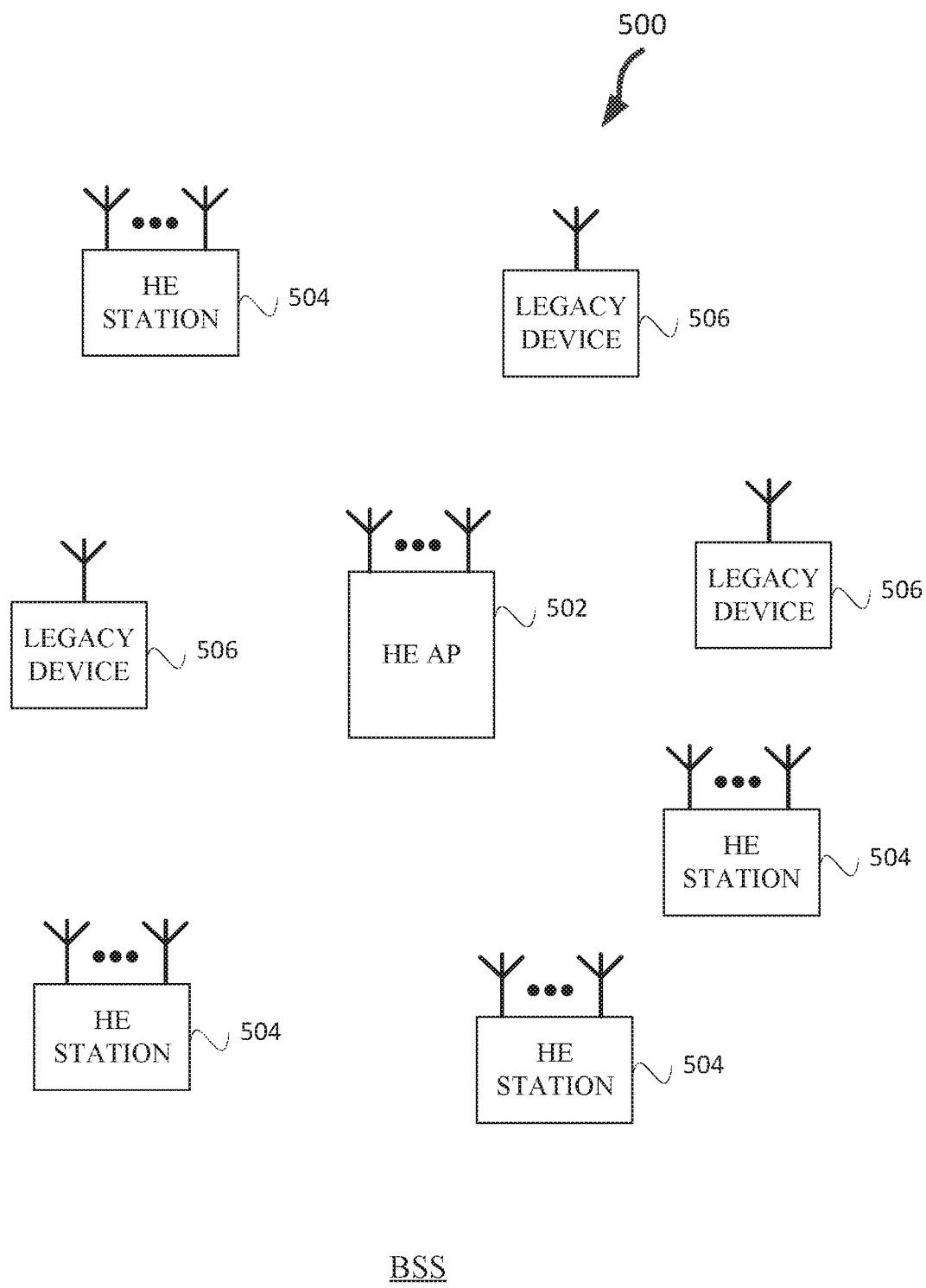
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.1 lax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.1 lax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different MAC layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments, the bandwidth of the channels may be based on a number of active data subcarriers. In some embodiments, the bandwidth of the channels is based on 26, 52, 106, 242, 484, 996, or 2×996 active data subcarriers or tones that are spaced by 20 MHz. In some embodiments, the bandwidth of the channels is 256 tones spaced by 20 MHz. In some embodiments, the channels are multiple of 26 tones or a multiple of 20 MHz. In some embodiments, a 20 MHz channel may comprise 242 active data subcarriers or tones, which may determine the size of a Fast Fourier Transform (FFT). An allocation of a bandwidth or a number of tones or subcarriers may be termed a resource unit (RU) allocation in accordance with some embodiments.

In some embodiments, the 26-subcarrier RU and 52-subcarrier RU are used in the 20 MHz, 40 MHz. 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 IX, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN). IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.1 lax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period. HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments, the trigger frame may indicate an uplink (UL) UL-MU-MIMO and/or UL OFDMA TXOP. In some embodiments, the trigger frame may include a DL UL-MU- MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.1 lmc. In example embodiments, the radio architecture of FIG. 1 is configured to implement one or more of the functions or methods of HE station 504 and/or HE AP 502. In example embodiments, the front-end module circuitry of FIG. 2 is configured to implement one or more of the functions or methods performed by HE station 504 and/or HE AP 502. In example embodiments, the radio IC circuitry of FIG. 3 is configured to implement one or more of the functions or methods performed by HE station 504 and/or HE AP 502. In example embodiments, the base-band processing circuitry of FIG. 4 is configured to implement one or more of the functions or methods performed by HE station 504 and/or the HE AP 502.

In example embodiments, HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-20.

In example embodiments, the HE station 504 and/or the HE AP 502 are configured to perform the methods and operations/functions described herein in conjunction with FIGS. 1-20. In example embodiments, an apparatus of the HE station 504 and/or an apparatus of the HE AP 502 are configured to perform the methods and functions described herein in conjunction with FIGS. 1-20. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
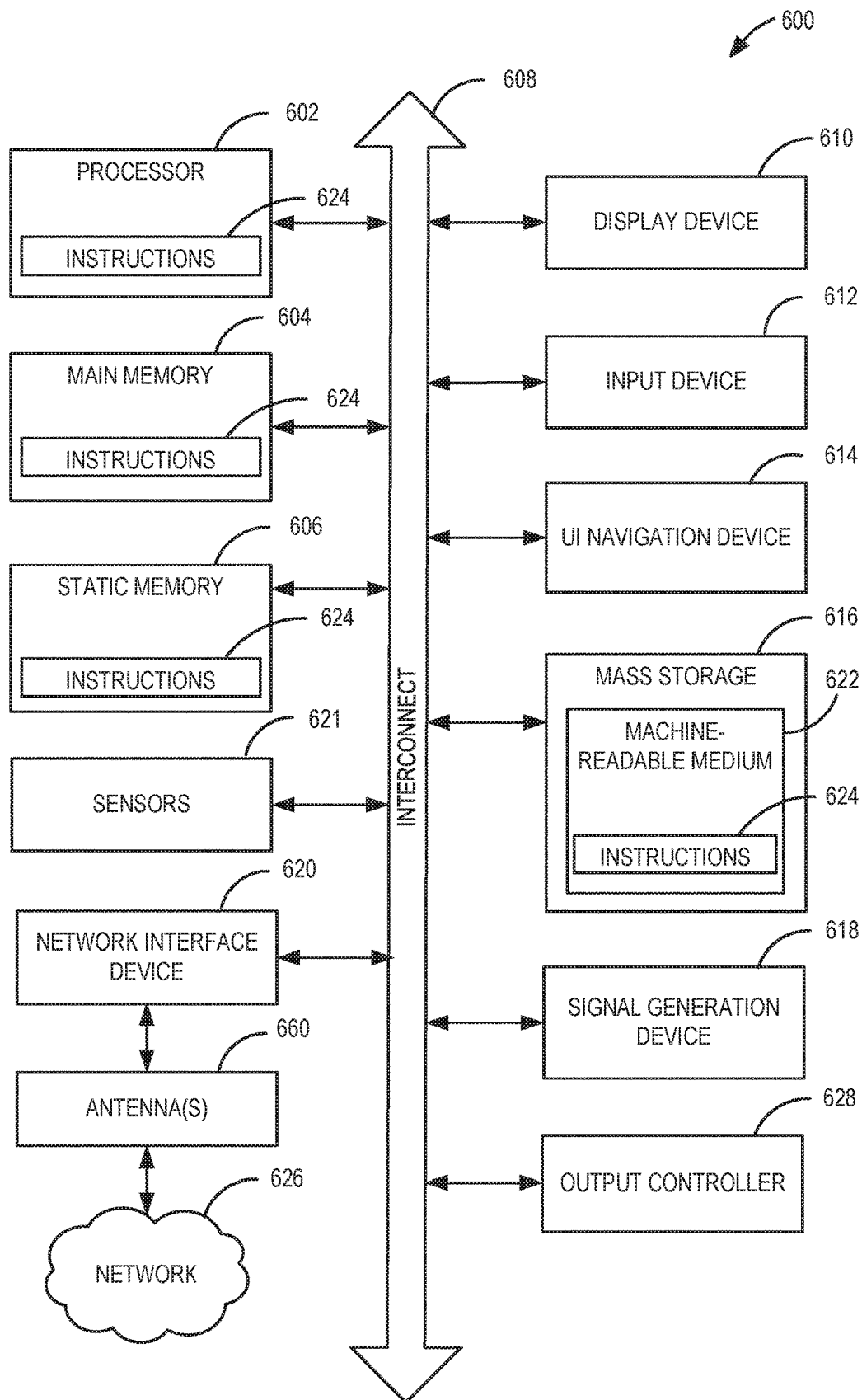
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fit, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
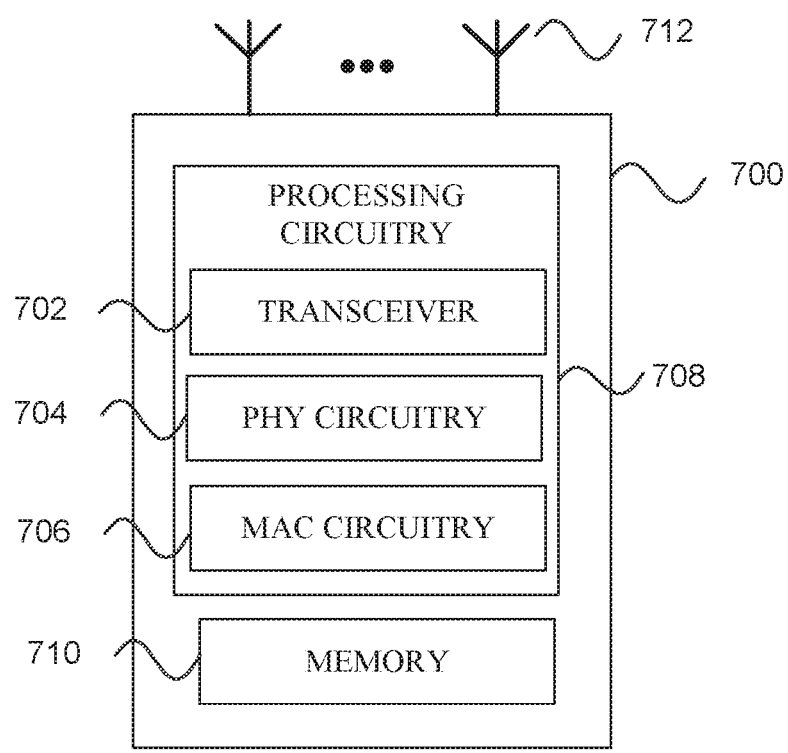
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments, the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors. DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in accordance with some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

FIG. 8 illustrates resource units (RUs) 808 for short feedback in accordance with some embodiments. Illustrated in FIG. 8 is resource block (RB) table 851, tone table 850, and frequency 814. The frequency 814 may be 20 MHz, 40 MHz, 80 MHz, 160 MHz, or another value. RB table 851 includes predetermined resource unit (P-RUs) 802, spatial stream (SS) 804, and RBs 812. The RB table 851 is divided into eighteen P-RUs 802, P-RU1 through P-RU18. Each of the P-RUs 802 is a subchannel or number of tones of frequency 814. For example, each P-RU 802 may have a bandwidth of approximately 2 MHz (e.g., 2.03125) with 26 tones as part of a 20 MHz channel. In some embodiments, for a 20 MHz frequency 814, each P-RU 802 is 12 tones, 18 tones, or another number of tones less than 242 tones (or a number of tones of the frequency 814). In some embodiments, each RB 812 may include a predetermined number of tones (which may or may not be contiguous), e.g., a predetermined number of tones between one (1) and fifty-two (52).

Each P-RU 802 may include a number of SSs 804. As illustrated, two SSs 804, SS1 and SS2. The RBs 812 are numbered sequentially based on the P-RUs 802 and the SSs 804. There are 36 RBs 812 in this illustration with each RB 812 being 12 tones and being one of two SSs 804. The RBs 812 may each be part of an HE long-training field (LTFXHE-LTF). The RBs 812 may indicate a portion of the HE-LTF. In some embodiments, the RBs 812 may be non-contiguous tones. In some embodiments, there may be unused tones, e.g., between the RBs 812, and here may be tones used for other purposes than RBs 812, e.g., as DC tones or beacon tones. In some embodiments, the RBs 812 may be specific to one symbol 810 and change for the next symbol 810.

The tone table 850 may use a P matrix table as an orthogonal code. The tone table 850 includes RUs 808 and symbols 810. The symbols 810 may indicate symbols 810 in time, e.g., symbol 810.1 may be transmitted first, and then symbol 810.2, etc. The symbols 810 may be HE-LTFs, e.g., as part of a trigger-based (TB) PPDU (TB PPDU). The symbols 810 have a duration, e.g., 16 μs per symbol or another duration.

Each RU 808 may be one or more RBs 812, and be one or more symbols 810. The RB 812 may indicate a portion of the symbol 810, e.g., tones. For example, as illustrated, RU 808 is an RB 812 (e.g., 12 tones) with one SS 804. The RU 808 may include indications of how a response is to be indicated (or encoded) on the RB 812 and symbol 810. For example, a value of one as a response may be indicated by transmitting energy on a first 6 tones of a RB 812 and not transmitting energy on a second 6 tones. A value of zero as response may be indicated by not transmitting energy on a first 6 tones of a RB 812 and transmitting energy on a second 6 tones. The receiver (e.g., HE AP 502) may measure the energy of both sets of 6 tones to determine the response, e.g., the receiver may determine whether a measured energy of the first or second set of 6 tones is a above a threshold to determine if the transmitter transmitted on the first or second set of 6 tones, respectively. In some embodiments, the different orthogonal codes may be used to transmit different values of the response. In some embodiments, different patterns of transmitting energy on a tone may indicate different responses.

In some embodiments, a RU 808 includes a number of tones on which to transmit the response to the feedback type, where the number of tones includes a first set of tones and a second set of tones, and where a transmission on the first set of tones without a transmission on the second set of tones indicates a first response to the feedback type, and where transmitting a transmission on the second set of tones without a transmission on the first set of tones indicates a second response to the feedback type.

Each RU 808 of the tone table 850 corresponds to a RB 812 for each of the two symbols 810. For example, RB1 with symbols 810.1 and 810.2 and corresponds to RU 808.1. The RB 812 indicates the tones and the SS 804. In some embodiments, RUs 808 are assigned to HE stations 504 in a null data packet (NDP) feedback report poll trigger frame, e.g., trigger frame 1214. In some embodiments, RUs 808 are assigned to HE stations 504 in a NDP feedback report poll 1420, 1520, 1620. In some embodiments, each RU 808 is used to transmit one bit of information from a HE station 504 to a HE AP 502. For example, for a HE station 504 to transmit a one (1) the HE station 504 may transmit the orthogonal code of the RU 808 to indicate one. In some embodiments, the HE station 504 may indicate a zero (0) by not transmitting on the RU 808.

In some embodiments, a different number of SSs 804 may be used, e.g., a number of SSs of one (1) to sixteen (16). In some embodiments, a different orthogonal code may be used, e.g., a different row of the P Matrix or a different orthogonal code. In some embodiments, the codes to indicate responses (e.g., part of the RUs 808) may be less than one symbol 810 duration). In some embodiments, a different number of symbols 810 may be used, e.g., one symbol 810 to twelve symbols 810. In some embodiments, the symbols 810 may have a duration of four (4) μs each. In some embodiments, the symbols 810 may have a different duration, e.g., one (1) μs to sixteen (16) μs. The RBs 812 (e.g., tones) may be divided by OFDMA and CDMA.

Figure 9:
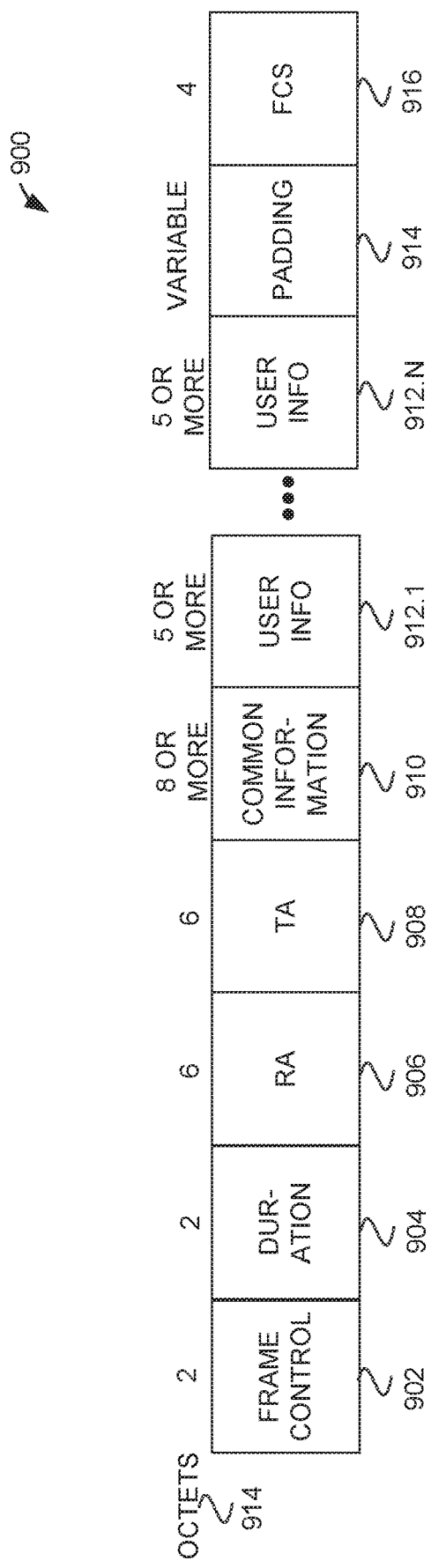
FIG. 9 illustrates a trigger frame in accordance with some embodiments.

FIG. 9 illustrates a trigger frame 900 in accordance with some embodiments. The trigger frame 900 may include a frame control field 902, a duration field 904, receive address (RA) field 906, transmitter address (TA) field 908, a common information field 910, user information fields 912, padding field 914, and frame control sequence (FCS) field 916.

The frame control field 902 may include information relating to the type of the trigger frame 900. For example, the frame control field 902 may include a protocol version that indicates a protocol version of a MAC portion of the trigger frame 900. In some embodiments, the frame control field 902 is 2 octets. In some embodiments, the frame control field 906 is a different number of octets.

The duration field 904 may be set to an estimated time for one or more response frames to the trigger frame 900, which may include additional frames from the transmitter of the trigger frame 900. The duration field 904 may include information regarding how long wireless devices (e.g., HE APs 502, HE stations 504, and/or legacy devices 506) not identified in the trigger frame 900 should set their network allocation vectors (not illustrated). The duration field 904 may include a duration of a transmission opportunity. In some embodiments, the duration field 904 is 2 octets. In some embodiments, the duration field 904 is a different number of octets.

The RA field 906 may be an address of the recipient HE station 504 or recipient HE AP 502. If the trigger frame 900 is addressed to more than one HE station 504 and/or HE AP 502, then the RA field 906 may be a broadcast address or multicast address. In some embodiments, the RA field 906 is 6 octets. In some embodiments, the RA field 906 is a different number of octets.

The TA field 908 may be the address of the STA (e.g. HE AP 502 that is transmitting the trigger frame 900). In some embodiments, the TA field 908 is the value of a BSS identification (ID)(BSSID)(not illustrated) wvhen the trigger frame 900 is addressed to HE stations 504 from at least two different BSS.

The common information field 910 may include information that is common to two or more the HE stations 504 the trigger frame 900 is for. An example common information field 910 is given in FIG. 10.

The user information field 912 may be one or more fields (e.g., 912.1 through 912.N) that are particular for a STA (e.g., HE station 504 and/or HE AP 502). In some embodiments, there are no user information fields 912. In some embodiments, a user information field 912 may provide information for more than one HE station 504.

The padding field 914 may include one or more octets for padding. The padding field 914 may pad the trigger frame 900 so that a length of the trigger frame 900 matches the number of bits required to end on a physical-level symbol boundary. The number of octets of the padding field 914 may be variable to match the number of bits required to end on a physical-level symbol, or may be variable for other reasons.

The FCS field 916 may be a checksum appended to the trigger frame 900 that may be for detecting corruption of the trigger frame 900. In some embodiments forward error correction information may be included in the FCS field 916. One or more of the fields of the trigger frame 900 may not be present, in accordance with some embodiments. In some embodiments, one or more additional fields may be included in the trigger frame 900. As disclosed in conjunction with FIG. 10, there may be different types of trigger frames 900, e.g., a null data packet (NDP) feedback report poll trigger frame. In some embodiments, one or more of the fields of the trigger frame 900 may not be included. In some embodiments, the trigger frame 900 may include one or more additional fields.

FIG. 10 illustrates a common information field 1000 in accordance with some embodiments. The common information field 1000 may be the same or similar as common information field 910.

The common information field 1000 may include a trigger type field 1002, a length field 1004, a cascade information field 1006, a carrier sense (CS) required field 1008, a bandwidth (BW) field 1010, a guard interval (GI) and a long-training field (LTF) type field 1012, a MU-MIMO LTF mode field 1014, a number of HE-LTF symbols field 1016, space-time block coding (STBC) field 1018, a low-density parity check (LDPC) extra symbols segment field 1020, AP transmit (TX) power field 1022, a packet extension field 1024, a spatial reuse field 1026, a Doppler field 1028, a HE-SIG-A reserved field 1030, a reserved field 1032, and a trigger dependent common information (INFO) field 1034. In some embodiments one or more of the fields of the common information field 1000 may not be present. In some embodiments one or more additional fields may be included in the common information field 1000.

The trigger type field 1002 may indicate a type of trigger frame. For example, Table 1 indicates some trigger frame types, in accordance with some embodiments.

TABLE 1

Trigger Frame Types

| Trigger Type Field 1002 Value | Description |
| --- | --- |
| 0 | Basic Trigger |
| 1 | Beamforming Report Poll |
| 2 | MU block acknowledgment request (BAR) |
| 3 | MU request to send (RTS) |
| 4 | Buffer Status Report Poll (BSRP) |

TABLE 1-continued

Trigger Frame Types

| Trigger Type Field 1002 Value | Description |
| --- | --- |
| 5 | Groupcast With Retries (GCR) |
| 6 | Bandwidth Query Report Poll (BQRP) |
| 7 | Null data packet (NDP) Feedback Report Poll |
| 8-15 | Reserved |

The length field 1004 may indicate the value of the L-SIG length field of a HE trigger-based PPDU that is the response to the trigger frame 900, in accordance with some embodiments. The cascade information field 1006 may indicate if a subsequent trigger frame follows the current trigger frame (e.g., 900), in accordance with some embodiments. The CS required field 1008 may indicate whether STAs identified in the user information fields 912 are to perform energy detect (ED) and check a network allocation vector (NAV) prior to transmitting, in accordance with some embodiments.

The BW field 1010 indicates the bandwidth of a response frame in accordance with some embodiments. The GI and a LTF type field 1012 indicates the GI and HE-LTF type of the HE TB PPDU response to the trigger frame (e.g., 900) in accordance with some embodiments.

The MU-MIMO LTF mode field 1014 indicates the LTF mode of the UL MU-MIMO HE TB PPDU response, in accordance with some embodiments. The number of HE-LTF symbols field 1016 indicates the number of HE-LTF symbols present in the HE TB PPDU that is in response to the trigger frame 900, in accordance with some embodiments. The STBC field 1018 indicates the status of STBC encoding of the HE TB PPDU that is in response to the trigger frame 900, in accordance with some embodiments.

The LDPC extra symbols segment field 1020 indicates the status of the LDPC extra symbol segment in accordance with some embodiments. The AP TX power field 1022 indicates the combined average power per 20 MHz bandwidth referenced to the antenna connector in accordance with some embodiments. The packet extension field 1024 indicates the packet extension duration of the HE TB PPDU that is the response to the trigger frame 900.

The spatial reuse field 1026 indicates information related to whether spatial reuse is permitted. For example, the spatial reuse field 1026 indicates a value (20 MHz, 40 MHz. 80 MHz, 160 MHz) of the HE-SIG-A field of the HE TB PPDU that is in response to the trigger frame 900. The Doppler field 1028 indicates a high Doppler mode of transmission. The HE-SIG-A reserved field 1030 indicates the values of the reserved bits in the HE-SIG-A2 subfield of the HE TB PPDU that is in response to the trigger frame 900, in accordance with some embodiments. The reserved field 1032 may be a reserved field for future use, in accordance with some embodiments.

The trigger dependent common information field 1034 may be a common information field 1034 for different trigger types 1002. Fields for the NDP feedback report poll trigger frame 1100 is example of trigger dependent common information fields 1034 for trigger frames of type NDP feedback report poll. In some embodiments, the NDP feedback report poll trigger frames does not include the trigger dependent common information field 1034. In some embodiments, one or more of the fields of the common information field 1000 are not present. In some embodiments, the common information field 1000 includes one or more additional fields (not illustrated). In some embodiments, one or more of the fields may be a different number of bits.

Figure 11:
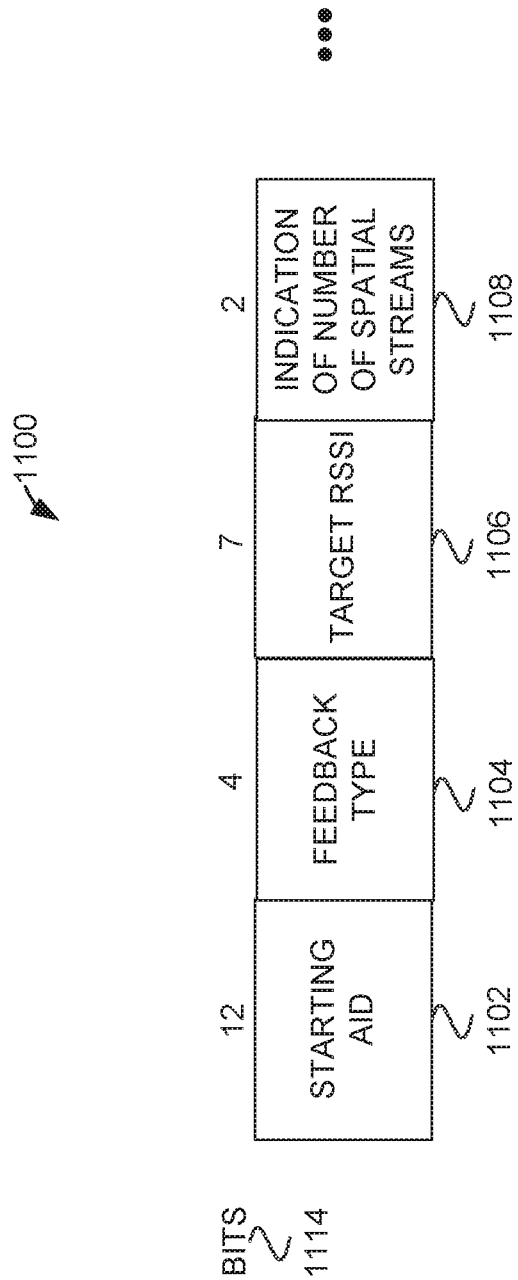
FIG. 11 illustrates fields of a NDP feedback report poll trigger frame in accordance with some embodiments.

FIG. 11 illustrates fields of a NDP feedback report poll trigger frame 1100 in accordance with some embodiments. Illustrated in FIG. 11 is a starting association identification (AID) field 1102, a feedback type field 1104, a target received signal strength indication (RSSI) field 1106, and an indication of number of spatial streams field 1108. In some embodiments, the fields of the NDP feedback report poll trigger frame 1100 are fields of a trigger dependent common information field (e.g., trigger dependent common information 1034) of a trigger frame 900 for the NDP feedback report poll (e.g., a value of 7 for trigger frame type, which indicates NDP feedback report poll), in accordance with some embodiments.

In some embodiments, the fields of a NDP feedback report poll trigger frame 1600 are fields for a user information field 912 of a trigger frame 900 for NDP feedback report poll. In some embodiments, one or more of the fields of the fields of the NDP feedback report poll trigger frame 1100 are not present. In some embodiments, one or more additional fields are included in the fields of the NDP feedback report poll trigger frame 1100.

The starting AID field 1102 may indicate the first AID (or the first AID plus or minus a constant) of a range of AIDs that are scheduled to respond to the trigger frame 900 of type NDP feedback report poll. The range of AIDs and total number of AIDs (NAIDS) that are scheduled by the trigger frame 900 may be determined based on PHY parameters such as one or more of the following: BW 1010, indication of number of spatial streams 1108, and number of users per set of tones (NbXnot illustrated). A HE station 504 is scheduled to respond to the trigger frame 900 of type NDP feedback report poll if the AID of the HE station 504 is larger than or equal to the value of the AID start field 1102 and lower than (plus or minus a constant) the value of the AID start field 1102 plus the NAIDS, in accordance with some embodiments. In some embodiments, the HE station 504 is scheduled to respond to the trigger frame 900 of type NDP feedback report poll based on the AID of the HE station 504, the value of the AID start field 1102 and the NAIDS.

The STA may determine its RU (e.g., RU 808) based on its relative position within the value of the starting AID field 1102 and the NAIDs. For example, if the value of staring AID field is 100 and the AID (not illustrated) of the HE station 504 AID is 105, then the HE station 504 index may be 5 or 6. The HE station 504 can determine its RU (e.g., RU 808) based on the HE station 504 index. A number of RUs 808 may be based on the bandwidth 1010 and a number of spatial streams, e.g., in FIG. 8 the bandwidth 1010 is 20 MHz and there are 36 RUs 808, but there would only be 18 RUs 808 if only one spatial streams 804 were used (e.g., the value of indication of number of spatial streams was 1). The HE station 504 may be configured to determine the number of RUs based on the bandwidth 1010 and a number of spatial streams. The HE station 504 may then determine the HE station's 504 RU 808 based on its index or a relative position, in accordance with some embodiments.

The feedback type field 1104 may indicate a type of feedback for the response to the trigger frame 900. Table 2 is an example of feedback types. A value of 0 of feedback type field 1104 may indicate that the response indicates whether the HE station 504 is requesting a resource. A HE station 504 may respond to the trigger frame 900 of type NDP feedback report poll on a RU 808. The feedback type field 1104 may include an indication of a feedback size (e.g., 1 or 2 bits), in accordance with some embodiments. The feedback type field S1104 may indicate that more than one type of feedback is being requested, e.g., resource request and ranging request.

Table 1 indicates values of the feedback type field 1104. Values of 1-15 of the feedback type field 1108 may be reserved for future use in accordance with some embodiments.

TABLE 1

Feedback Types

| Value | Description |
|---|---|
| 0 | Resource Request |
| 1-15 | Reserved |

The target RSSI field 1106 may indicate a target received signal power of the NDP feedback report response (e.g., 1210) to the trigger frame 900. In some embodiments, the value of the target RSSI field 1106 may be in dBs.

The indication of number of spatial streams 1108 may indicate a number of spatial streams 804 that are to be used for the response, e.g., that are used for RUs 808 in the response.

In some embodiments, the fields of a NDP feedback report poll trigger frame 1100 includes a RU allocation offset field, which may be an offset for RU allocations. For example, the HE station 504 may use the offset to determine the RU 808 to use to respond to the NDP feedback report poll trigger frame (e.g., 1214). In some embodiments, the fields of a NDP feedback report poll trigger frame 1100 includes a feedback size field that may indicate a size for the response (e.g., 1210), e.g. 1 or 2 bits. In some embodiments, the fields of a NDP feedback report poll trigger frame 1100 includes a number of users per set of tones field, which may indicate a number of users per a set of tones. For example, the number of users per set of tones field may indicate a number of user (e.g., RBs or RUs) per 20 MHz bandwidth, which the HE station 504 may use to determine the NAnms and the RU.

Figure 12:
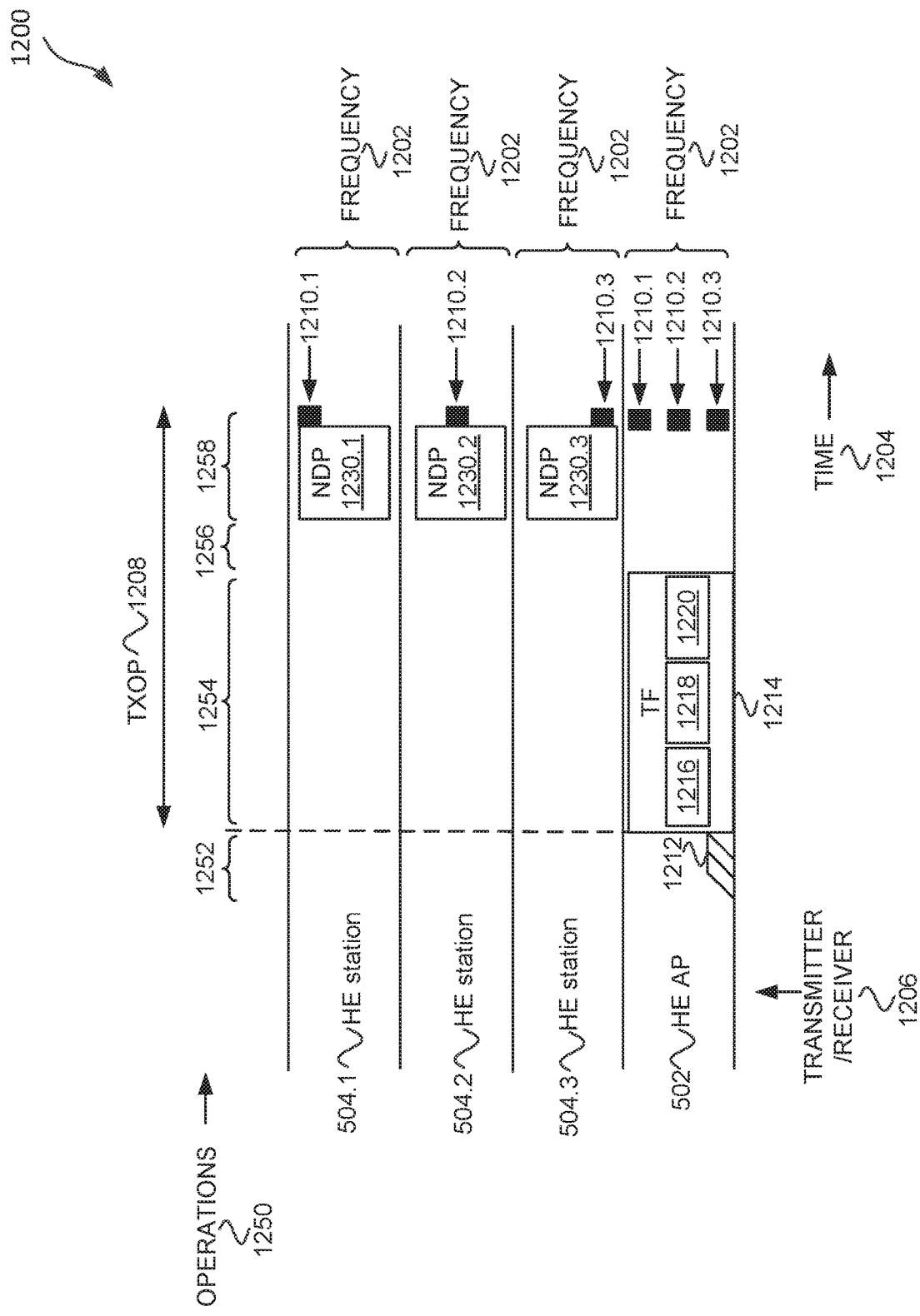
FIG. 12 illustrates a method of NDP feedback report poll in accordance with some embodiments.

FIG. 12 illustrates a method 1200 of null data packet (NDP) feedback report poll in accordance with some embodiments. Illustrated in FIG. 12 is a frequency 1202, time 1204, transmitter/receiver 1206, transmission opportunity (TXOP) 1208, responses 1210, and NDP feedback report poll trigger frame 1214.

The frequency 1214 may be a bandwidth, e.g., 20 MHz. The frequency 1214 may be the same or similar as frequency 814. Time 1204 may indicate the progression of time. Transmitter/receiver 1206 indicates the device that is transmitting and/or receiving, e.g., HE stations 504 and HE AP 502.

The method 1200 begins at operation 1252 with the HE AP 502 contending for the wireless medium 1212. In operation 1252, the HE AP 502 acquires access to the wireless medium.

The method 1200 continues at operation 1254 with the HE AP 502 transmitting the trigger frame 1214. The trigger frame 1214 may be a NDP feedback report poll trigger frame, e.g., a trigger frame 900 with a value of the trigger type field 1002 of NDP feedback report poll trigger frame.

The trigger frame 1214 may include a schedule field 1216, a feedback type field 1218, and an indication of RU field 1220. The schedule field 1216 may include one or more fields that enable the HE stations 504 to determine if they are to respond to the trigger frame 1214. For example, as described in conjunction with FIG. 11, the starting AID field 1102, the AID of the HE station 504, and fields to determine NAIDS may be sufficient for the HE station 504 to determine if it is to respond to the trigger frame 1214. The schedule field 1216 may indicate that the HE station 504 is scheduled in different ways as described herein (e.g., the trigger frame 1214 may include an address of the HE station 504 or a group address that includes the HE station 504).

The feedback type field 1218 may be an indication of one or more of: feedback type, a feedback size, and/or a number of feedback types. For example, the feedback type field 1218 may be the same or similar as feedback type 1104.

The method 1200 continues at operation 1256 with the HE stations 504 waiting a duration before transmitting NDPs 1230. The duration may be a short interframe space (SIFS).

The HE stations 504 may decode the trigger frame 1214 and determine if they are scheduled based on schedule field 1216. If the HE stations 504 are scheduled, then the HE stations 504 may determine a response based on the feedback type field 1218. For example, the HE stations 504 may determine a 1 bit response regarding whether they have data for UL to the HE AP 502. e.g., a value of feedback type field 1104 of 1 as described in conjunction with Table 1.

The method 1200 continues at operation 1258 with the HE stations 504 encoding and transmitting a a NDP 1230 and response 1210 to the trigger frame 1214. The NDP 1230 and response 1210 may be a TB PPDUs with no data portion. For example, a legacy short training field (L-STF), legacy long training field (L-LTF), a legacy signal field (L-SIG), a repeated L-SIG (RL-SIG), a HE signal A field (HE-SIG-A), a HE short training field (HE-STF), and then a HE-LTF with two symbols.

The NDPs 1230 may be the portion of the TB PPDU up to the HE-LTF. In some embodiments, the NDPs 1230 include the HE-LTFs 1210. The responses 1210 may be transmitted during the HE-LTF and be RUs 808 of the HE-LTF. For example, 1210.1 may be RU 808.2. HE station 504 may transmit energy on a first set of six tones and not transmit energy on a second set of six tones to indicate a 1 and similarly for indicating a 0 as described in conjunction with FIG. 8.

The HE AP 502 may decode the responses 1210 and determine what the responses 1210 indicate. For example, the HE AP 502 may measure the energy on each set of six tones and if the energy is above a threshold value determine that the HE station 504 transmitted energy on those six tones. The HE stations 504 may indicate their responses 1210 in different ways including using orthogonal codes of transmitting energy (positive or negative values) as disclosed in conjunction with FIG. 8.

The HE AP 502 may take action based on the responses 1210. For example, the HE AP 502 may encode a new trigger frame for a MU UL transmission for the HE stations 504 that indicate that they have UL data (or based on an amount of data indicated) for the HE AP 502.

Method 1200 may be performed by an apparatus of a HE station 504, an apparatus of an HE AP 502, a HE station 504, or a HE AP 502. Method 1200 may include one or more additional operations 1250. One or more operations 1250 of method 1200 may not be performed.

Figure 13:
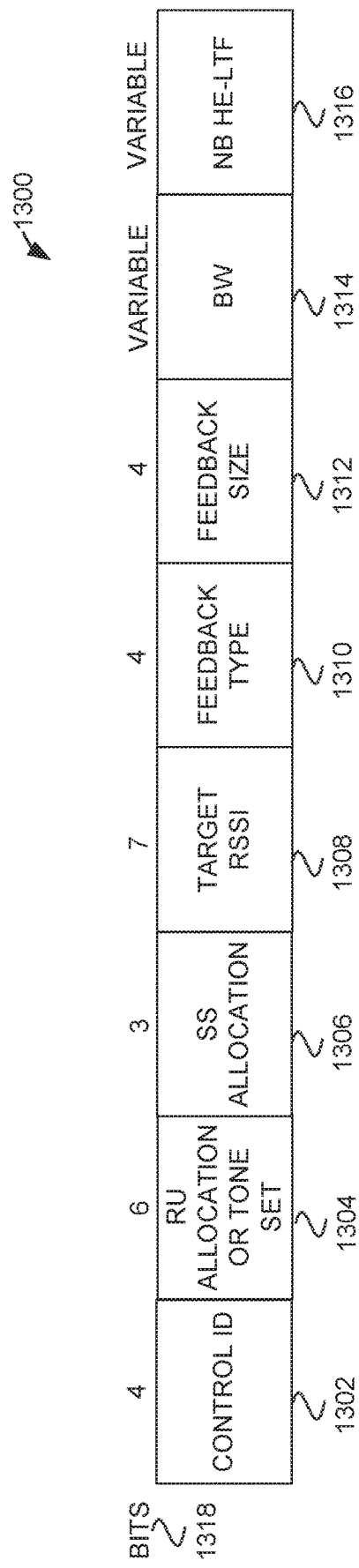
FIG. 13 illustrates an A-control field NDP feedback report poll in accordance with some embodiments.

FIG. 13 illustrates an A-control field NDP feedback report poll 1300 in accordance with some embodiments. The A-control field NDP feedback report poll 1300 includes one or more of the following fields control ID 1302, RU allocation or tone set 1304, SS allocation 1304, target RSSI 1308, feedback type 1310, feedback size 1312, BW 1314, and Nb HE-LTF 1316. The A-control field NDP feedback report poll 1300 may be a unicast A-control field NDP feedback report poll.

The A-control field NDP feedback report poll 1300 may be an A-Control subfield in accordance with one or more communication standards, e.g., IEEE 802.1 lax. The unicast A-control field NDP feedback report poll 1300 may include the control ID 1302 and control information. The control information may be the rest of the other field (e.g., 1304 through 1316). The control ID 1302 may identify the type of information. An A-control subfield may be included in downlink (DL) PPDUs in a MAC portion where a MAC portion address (e.g., destination address) identifies the HE station 504.

The RU allocation or tone set field 1304 may be an offset for RU allocations. For example, the HE station 504 may use the offset to determine the RU 808 to use to respond. The RU allocation or tone set 1304 may indicate an RU 808, which may be based on the BW 1314 and/or SS allocation 1306.

The SS allocation field 1306 may indicate a P-matrix or one or more SSs for the HE station 504 to use for the response. In some embodiments, the SS allocation field 1306 may indicate the number of SSs that are being used by all HE stations 504 that are responding.

The target RSSI field 1308 may indicate a target received signal power of the NDP feedback report response to the DL PPDU carmying the A-control field NDP feedback report poll 1300. In some embodiments, the value of the target RSSI field 1308 may be in dBs.

The feedback type field 1310 may indicate a type of feedback for the response. Table 2 is an example of feedback types. A value of 0 may indicate that the response is a resource request where the HE station 504 indicates either a size of UL data or whether UL RUs are being requested. A HE station 504 may respond on a RU 808. The feedback type field 1310 and feedback size field 1312 may be combined into a single field, in accordance with some embodiments. For example, a combined feedback type field 1310 and feedback size field 1312 may have a value that indicates both a feedback type (e.g., Table 2) and a feedback size (e.g., Table 3). Values of 1-15 of the feedback type field 1310 may be reserved for future use in accordance with some embodiments.

TABLE 2

| Feedback Types | |
| --- | --- |
| Value | Description |
| 0 | Resource Request |
| 1-15 | Reserved |

In some embodiments, a value of 1 of feedback type field 1310 may indicate a power save (PS) poll feedback type. In some embodiments, a value of 2 of feedback type field 1310 may indicate a ranging request poll feedback type. In some embodiments, a value of 3 of feedback type field 1310 may indicate a combined resource request and ranging request which may have a two bit response. Different values may be used for the feedback types and additional feedback types may be used. In some embodiments, each feedback type includes an associated number of bits per feedback. For example, 1 bit for resource request, etc.

The feedback size field 1312 may indicate a number of bits of feedback. The responses for a feedback type may be different depending on a value of the feedback size field 1312. The BW field 1314 may be the same or similar as BW field 1010. The Nb HE-LTF 1316 may indicate a number of tones per HE-LTF. For example, there may be 240 (or 242) tones per HE-LTF for a 20 MHz bandwidth.

In some embodiments, the unicast A-control field NDP feedback report poll 1300 includes a number of users (HE stations 504) per a set of tones. For example, the number of users per set of tones field may indicate a number of user per 20 MHz bandwidth (e.g., in FIG. 8 there are 18 users per set of tones.) The number of users per a set of tones and a number of tones per user can be used to determine a location of the tones for an HE station 504 and whether the HE station 504 is scheduled for a response.

In some embodiments, the feedback size field 1312 is not included. In some embodiments, the Nb HE-LTF field 1316 is not included. In some embodiments, the RU allocation or tone set field 1304 and SS allocation field 1306 are combined into one field. In some embodiments, the BW field 1314 is not included.

Figure 14:
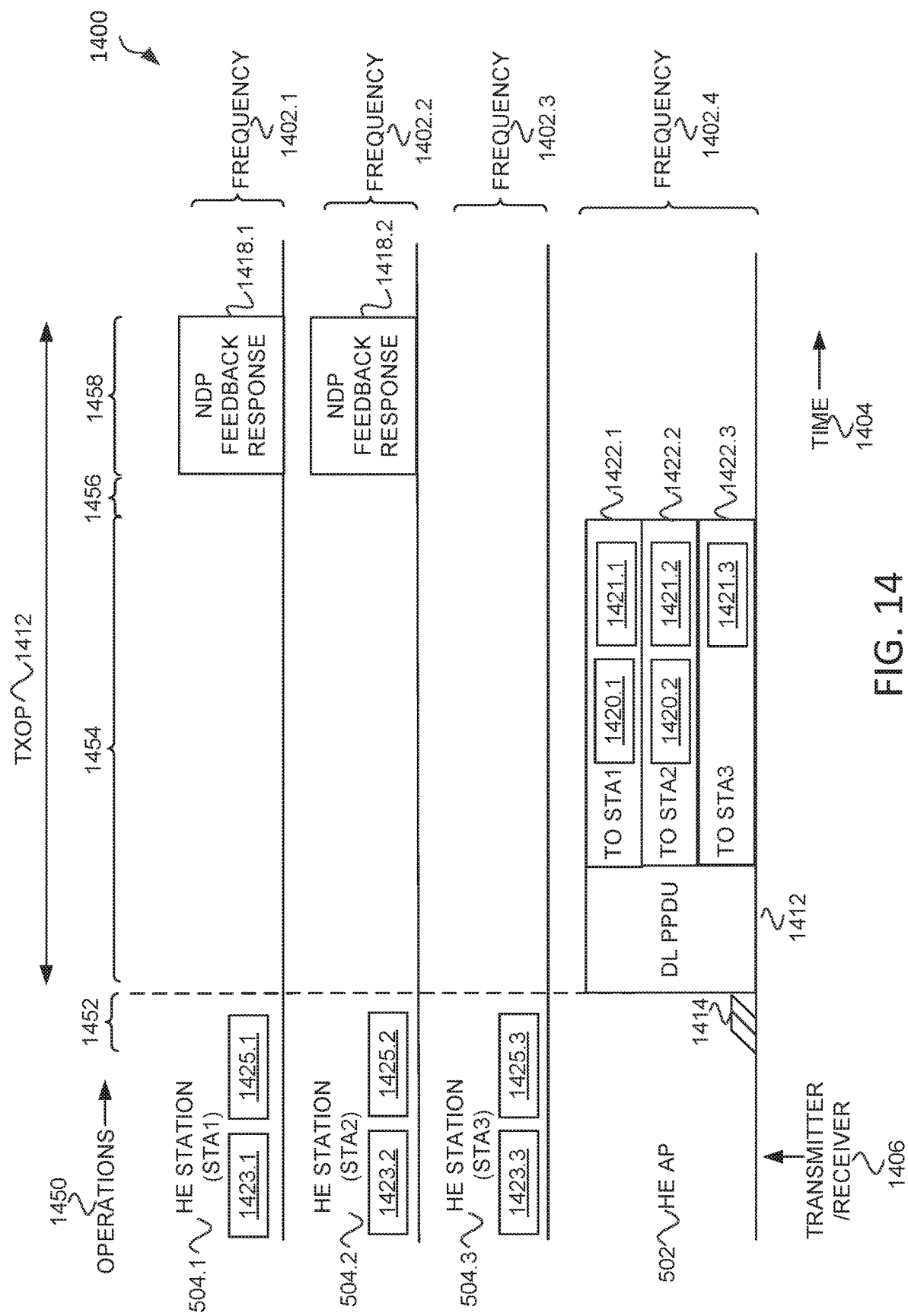
FIG. 14 illustrates a method of control field trigger for NDP feedback report in accordance with some embodiments.

FIG. 14 illustrates a method 1400 of control field trigger for NDP feedback report in accordance with some embodiments. Illustrated in FIG. 14 is a frequency 1402, time 1404, transmitter/receiver 1406, TXOP 1412, responses 1418, DL PPDU 1412, and operations 1450.

The frequency 1402 may be a bandwidth, e.g., 20 MHz. The frequency 1214 may be the same or similar as frequency 814. Time 1404 may indicate the progression of time. Transmitter/receiver 1406 indicates the device that is transmitting and/or receiving, e.g., HE stations 504 and HE AP 502.

The HE stations 504 may include a MAC address 1423 and an AID 1425. The AID 1425 may be assigned to the HE station 504 by the HE AP 502 during association.

The method 1400 begins at operation 1452 with the HE AP 502 contending for the wireless medium 1414. The HE AP 502 acquires access to the wireless medium in operation 1452.

The method 1400 continues at operation 1454 with the HE AP 502 transmitting a DL PPDU 1412. The DL PPDU 1412 may include portions 1422 (e.g., MAC protocol data units, MPDUs) that are addressed (e.g., destination addresses 1421) to individual HE stations 504. For example, destination address 1421.1 may be a MAC address 1423.1 of HE station 504.1. As illustrated, the DL PPDU 1412 includes a portion 1422.1 addressed to STA1 (destination address 1421.1 having a value of the MAC address 1423.1 of HE station 504.1), a portion 1422.2 addressed to STA2 (destination address 1421.2 having a value of the MAC address 1423.2 of HE station 504.2), and a portion 1422.3 addressed to STA3 (destination address 1421.3 having a value of the MAC address 1423.3 of HE station 504.3). In some embodiments, the destination address 1421.3 may be a multi-cast or broadcast address that includes the MAC address of HE station 504.1. The portions 1422 may be MPDUs that include addresses to the respective HE stations 504. The portion 1422.1 and portion 1422.2 may include information for NDP feedback report poll 1420, e.g., an A-control field NDP feedback report poll. For example, the information for the NDP feedback report poll 1420.1, 1420.2 may comprise an A-control field NDP feedback report poll 1300 as disclosed in conjunction with FIG. 13. The HE stations 504 may determine if they are schedule based on the MAC address 1421.

The method 1400 continues at operation 1456 with the HE stations 504 waiting a duration, e.g., SIFS, before transmitting. HE station 504.1 and HE station 504.2 decode the DL PPDU 1412 and determine that they contain portions 1422 (e.g., MPDUs) that are addressed to each of them. HE station 504.1 and HE station 504.2 then decode the information for NDP feedback report poll 1420 and determine that they are to respond after a SIFS duration. HE station 504.1 and HE station 504.2 may determine an RU allocation to transmit a NDP feedback response 1418 and determine the feedback type (e.g., based on a value of feedback type field 1310, and, in some embodiments the value of the feedback size field 1312) based on the information for NDP feedback report poll 1420 and based on the portions (e.g., MPDU) being addressed to the HE station 504.1 and HE station 504.2.

The method 1400 continues at operation 1458 with HE station 504.1 and HE station 504.2 transmitting NDP feedback response 1418.1 and NDP feedback response 1418.2, respectively. The NDP feedback response 1418 may be the same or similar as NDP 1230 and response 1210. The NDP feedback responses 1418 may be transmitted on an RU 808 as disclosed in conjunction with FIG. 8. The NDP feedback responses 1418 may be NDP TB PPDUs with the response being transmitted on a HE-LTF portion of the NDP TB PPDU, e.g., as disclosed in conjunction with FIGS. 8 and 12. HE station 504.3 may not transmit as it did not receive the information for NDP feedback report poll 1420. HE station 504.3 may have not received an indication to transmit and the DL PPDU 1412 may have had a duration (e.g., 904) that indicates a length of a TXOP 1412 or a duration for HE station 504.3 to defer before trying to transmit.

Method 1400 may be performed by an apparatus of a HE station 504, an apparatus of an HE AP 502, a HE station 504, or a HE AP 502. Method 1400 may include one or more additional operations 1450. One or more of operations 1450 of method 1400 may not be performed.

Figure 15:
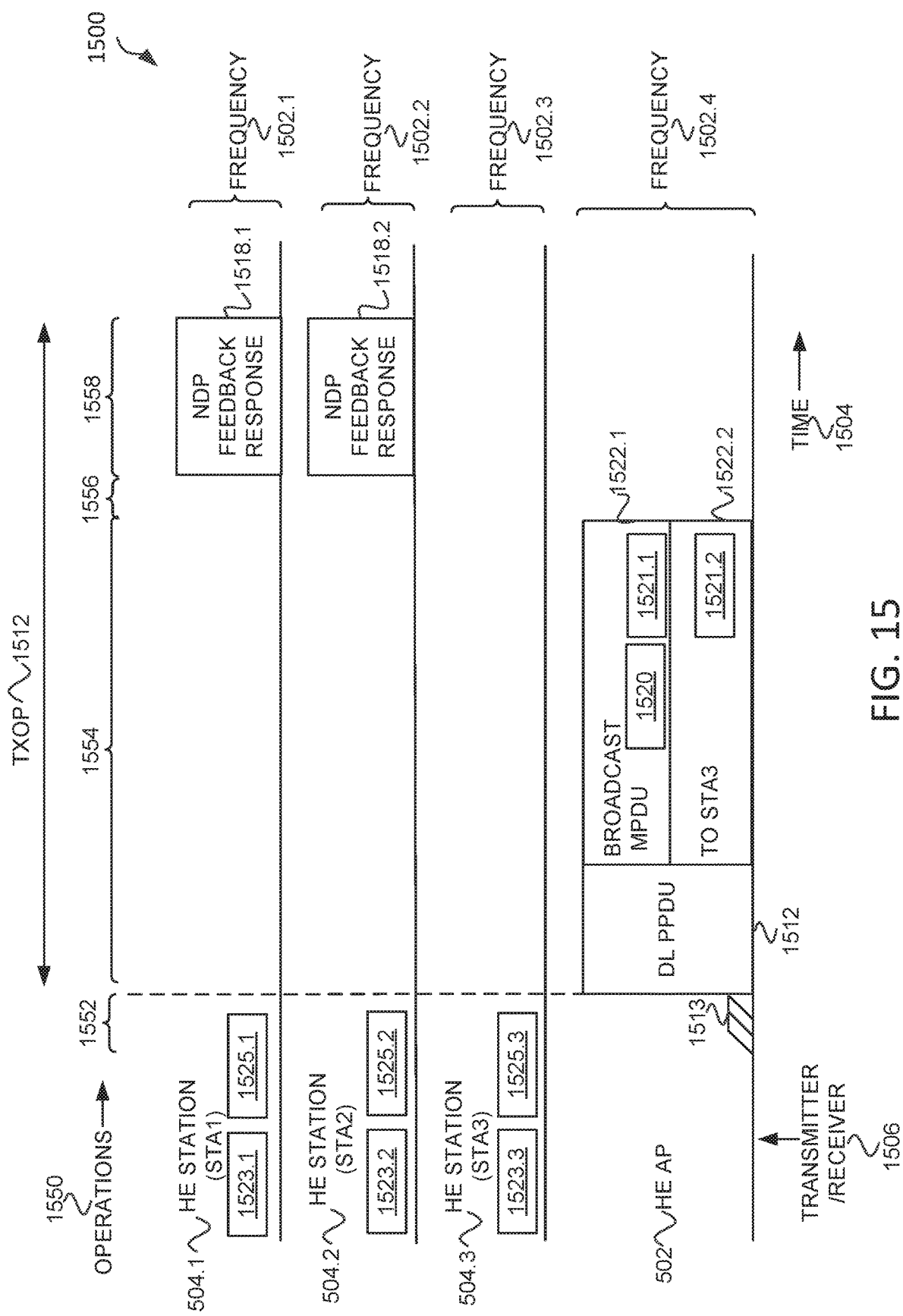
FIG. 15 illustrates a method of control field trigger for NDP feedback report in accordance with some embodiments.

FIG. 15 illustrates a method 1500 of control field trigger for NDP feedback report in accordance with some embodiments. Illustrated in FIG. 15 is a frequency 1502, time 1504, transmitter/receiver 1506, TXOP 1512, responses 1518, DL PPDU 1512, and operations 1550.

The frequency 1502 may be a bandwidth, e.g., 20 MHz. The frequency 1514 may be the same or similar as frequency 814. Time 1504 may indicate the progression of time. Transmitter/receiver 1506 indicates the device that is transmitting and/or receiving, e.g., HE stations 504 and HE AP 502.

The HE stations 504 may include a MAC address 1523 and an AID 1525. The AID 1525 may be assigned to the HE station 504 by the HE AP 502 during association.

The method 1500 begins at operation 1552 with the HE AP 502 contending for the wireless medium 1513. The HE AP 502 acquires access to the wireless medium during operation 1552.

The method 1500 continues at operation 1554 with the HE AP 502 transmitting a DL PPDU 1512. The DL PPDU 1512 may include portions 1522 (e.g., MPDU). The portions 1522 may each include a destination address 1521. The destination address 1521 may be a MAC address of the intended recipient of the portion 1522. As illustrated, the DL PPDU 1512 includes a portion 1522.1 that has a destination address 1521.1 with a value that is a broadcast address, and a portion 1522.2 that has a destination address 1521.2 with a value of the MAC address 1523.3 of STA3 (HE station 504.3). The portion 1522.1 includes information for NDP feedback report poll 1520, e.g., an A-control field NDP feedback report poll. For example, portion 1522.1 may be a broadcast A-control field NDP feedback report poll. When HE stations 504 decode the DL PPDU 1512, they may then decode the portions 1522.

A HE station 504 may determine whether the portions 1522 are addressed to the HE station 504. In the case of the portion 1522.1, a HE station 504 may first determine that it is a broadcast MPDU and then determine that it includes information for NDP feedback report poll 1520. The HE station 504 may then determine if the information for NDP feedback report poll 1520 indicates that the HE station 504 is scheduled by the information for NDP feedback report poll 1520. The information for NDP feedback report poll 1520 may be the same or similar as fields of a NDP feedback report poll trigger frame 1100. For example, the HE station 504 may determine if it is scheduled based on the starting AID 1102 (FIG. 11) and on AID 1525 of the HE station 504, as disclosed herein.

In some embodiments, the information for NDP feedback report poll 1520 may include one or more fields of a unicast A-control field NDP feedback report poll 1300 as well as one or more fields of fields of a NDP feedback report poll trigger frame 1100. The information for NDP feedback report poll 1520 needs information so that the HE station 504 can determine if it is scheduled, determine the type of response requested, and determine which RU (e.g., 808) to transmit the response. In some embodiments, the information for NDP feedback report poll 1520 includes one or more of the fields from a unicast A-control field NDP feedback report poll 1300, e.g., it may include one or more of the fields plus a starting AID field 1102.

The method 1500 continues at operation 1556 with the HE stations 504 waiting a duration, e.g., SIFS, before transmitting. HE station 504.1 and HE station 504.2 decode the DL PPDU 1512 and determine that they contain portion 1522.1 (e.g., MPDUs) that includes a broadcast address. HE station 504.1 and HE station 504.2 then determine if they are scheduled by the information for NDP feedback report poll 1520 (e.g., as disclosed in conjunction with FIG. 12). HE station 504.1 and HE station 504.2 then determine the type of NDP feedback response 1518 requested, e.g., as disclosed in conjunction with FIGS. 12 and 14. HE station 504.1 and HE station 504.2 then determine an RU to transmit the NDP feedback response 1518, e.g., as disclosed in conjunction with FIGS. 12 and 14.

HE station 504.3 determines that portion 1521.2 (e.g., MPDU) is addressed to HE station 504.3. For example, HE station 504.3 may determine that destination address 1521.2 is a value of MAC address 1525.3 of HE station 504.3. HE station 504.3 decodes portion 1522, but, in accordance with some embodiments, does not transmit in operation 1558 because the portion 1522.2 does not indicate that HE station 504.3 should transmit.

The method 1500 continues at operation 1558 with HE station 504.1 and HE station 504.2 transmitting NDP feedback response 1518.1 and NDP feedback response 1518.2, respectively. The NDP feedback response 1518 may be the same or similar as NDP feedback response 1418, and/or NDP 1230 and response 1210. The NDP feedback responses 1518 may be transmitted on an RU 808 as disclosed in conjunction with FIG. 8. The NDP feedback responses 1518 may be NDP TB PPDUs with the response being transmitted on a HE-LTF portion of the NDP TB PPDU, e.g., as disclosed in conjunction with FIGS. 12 and 14. HE station 504.3 may not transmit as it did not receive the information for NDP feedback report poll 1520. HE station 504.3 may have not have received an indication to transmit and the DL PPDU 1512 may have a duration (e.g., 904) that indicates a length of a TXOP 1512 or a duration for HE station 504.3 to defer before trying to transmit.

Method 1500 may be performed by an apparatus of a HE station 504, an apparatus of an HE AP 502, a HE station 504, or a HE AP 502. Method 1500 may include one or more additional operations 1550. One or more of operations 1550 of method 1500 may not be performed.

Figure 16:
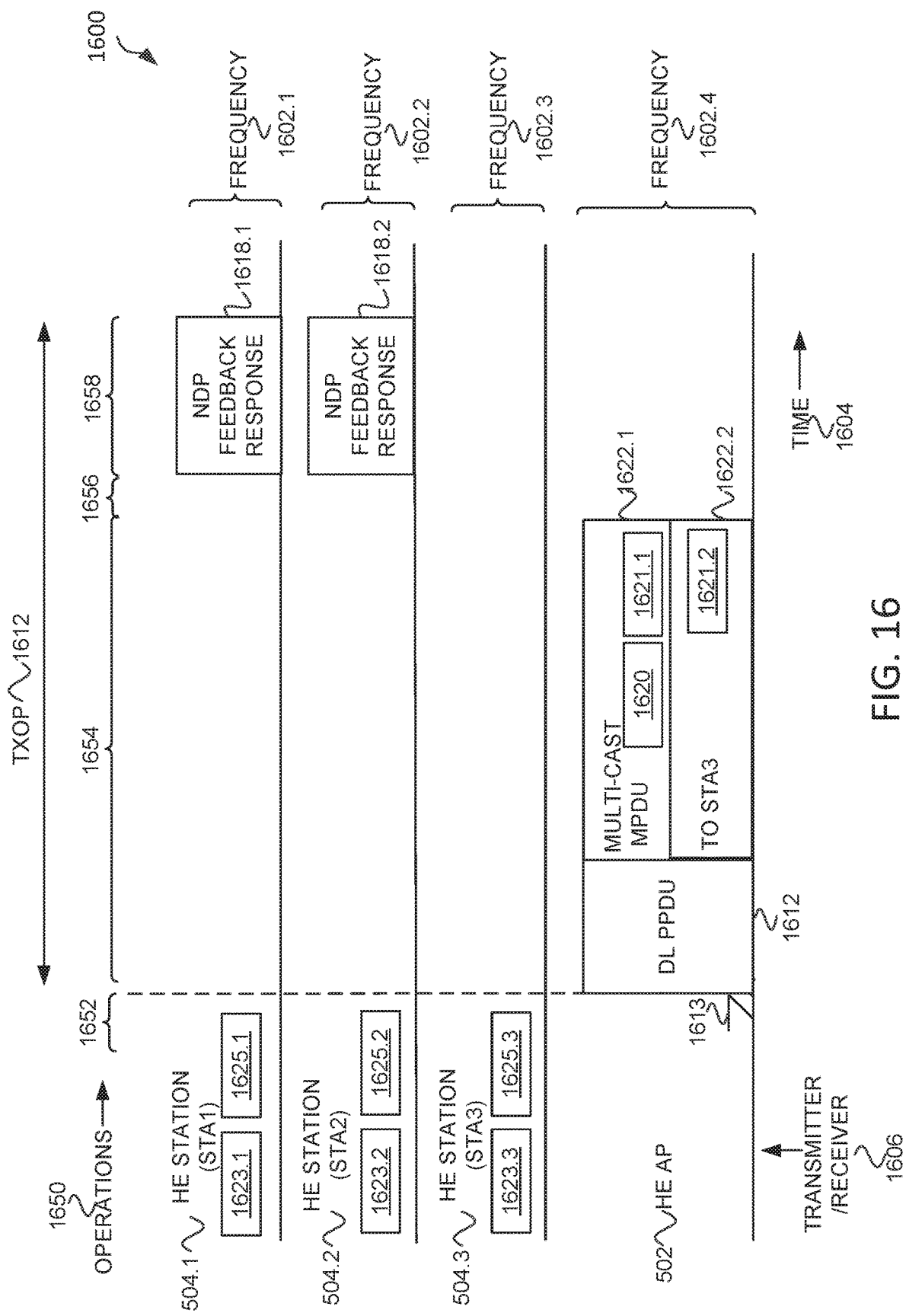
FIG. 16 illustrates a method of control field trigger for NDP feedback report in accordance with some embodiments.

FIG. 16 illustrates a method 1600 of control field trigger for NDP feedback report in accordance with some embodiments. Illustrated in FIG. 16 is a frequency 1602, time 1604, transmitter/receiver 1606, TXOP 1608, responses 1618, DL PPDU 1612, and operations 1650.

The frequency 1602 may be a bandwidth, e.g., 20 MHz. The frequency 1614 may be the same or similar as frequency 814. Time 1604 may indicate the progression of time. Transmitter/receiver 1606 indicates the device that is transmitting and/or receiving, e.g., HE stations 504 and HE AP 502.

The HE stations 504 may include a MAC address 1623 and an AID 1625. The AID 1625 may be assigned to the HE station 504 by the HE AP 502 during association.

The method 1600 begins at operation 1652 with the HE AP 502 contending for the wireless medium 1613. The HE AP 502 acquires access to the wireless medium during operation 1652.

The method 1600 continues at operation 1654 with the HE AP 502 transmitting a DL PPDU 1612. The DL PPDU 1612 may include portions 1622 (e.g., MAC protocol data unit, MPDU). Portion 1622.1 may include a destination address 1621. As illustrated, the DL PPDU 1612 includes a portion 1622.1 that has a destination address 1621.1 with a value of a multi-cast address (to MAC address 1623.1 of HE station 504.1 and MAC address 1623.2 of HE station 504.2) and a portion 1622.2 with destination address (unicast) of MAC address of HE station 504.3 (STA3). The portions 1622 may be MPDUs that include addresses (e.g., unicast to individual HE stations 504, group addresses, or broadcast addresses). The portion 1622.1 includes information for NDP feedback report poll 1620, e.g., an A-control field NDP feedback report poll.

For example, portion 1622.1 may be a MPDU that includes a A-control field NDP feedback report poll. When HE stations 504 decode the DL PPDU 1612 they may then decode the portions 1622. A HE station 504 may determine whether the portions 1622 are addressed to the HE station 504. In the case of the portion 1622.1, a HE station 504 may first determine that it is a multi-cast MPDU and then determine whether the address of the HE station 504 is included in the multi-cast address. In some embodiments, the HE station 504 may then determine if the information for NDP feedback report poll 1620 indicates that the HE station 504 is scheduled by the information for NDP feedback report poll 1620. In some embodiments, the HE station 504 is scheduled if the multi-cast address (e.g., the value of destination address 1621.1) indicates the address of the HE station 504 is part of the multi-cast address.

The information for NDP feedback report poll 1620 may be the same or similar as fields of a NDP feedback report poll trigger frame 1100. For example, the HE station 504 may determine if it is scheduled based on the starting AID 1102 as disclosed herein. In some embodiments, the information for NDP feedback report poll 1620 may include one or more fields of an A-control field NDP feedback report poll 1300 as well as one or more fields of fields of a NDP feedback report poll trigger frame 1100. The information for NDP feedback report poll 1620 needs information so an HE station 504 can determine the type of response requested and determine which RU (e.g., 808) to transmit the response. In some embodiments, the information for NDP feedback report poll includes one or more of the fields from an A-control field NDP feedback report poll 1300. In some embodiments, the information for NDP feedback report poll 1620 includes information (e.g., starting AID 1102) so that the HE station 504 may determine if it is scheduled.

The method 1600 continues at operation 1656 with the HE stations 504 waiting a duration, e.g., SIFS, before transmitting. HE station 504.1 and HE station 504.2 decode the DL PPDU 1612 and determine that they contain portion 1622.1 (e.g., MPDUs) that is a multi-cast address. HE station 504.1 and HE station 504.2 then determine that they are schedule based on their addresses (e.g., MAC addresses 1623.1, 1623.2) being included in the multi-cast address. In some embodiments, HE station 504.1 and HE station 504.2 may first determine their addresses are included in the multi-cast address and then determine if they are scheduled based on the information for NDP feedback report poll 1620 (e.g., starting AID 1102 as disclosed in conjunction with FIG. 12). HE station 504.1 and HE station 504.2 then determine the type of NDP feedback response 1618 requested, e.g., as disclosed in conjunction with FIGS. 12, 14, and 15. HE station 504.1 and HE station 504.2 then determine an RU to transmit the NDP feedback response 1618, e.g., as disclosed in conjunction with FIGS. 12, 14 and 15.

HE station 504.3 determines that portion 1622.2 (e.g., MPDU) is addressed to HE station 504.3. HE station 504.3 decodes portion 1622, but, in accordance with some embodiments, does not transmit in operation 1658 because the portion 1622.2 does not indicate that HE station 504.3 should transmit.

The method 1600 continues at operation 1658 with HE station 504.1 and HE station 504.2 transmitting NDP feedback response 1618.1 and NDP feedback response 1618.2, respectively. The NDP feedback response 1618 may be the same or similar as NDP feedback response 1518, 1418, and/or NDP 1230 and response 1210. The NDP feedback responses 1618 may be transmitted on an RU 808 as disclosed in conjunction with FIG. 8. The NDP feedback responses 1618 may be NDP TB PPDUs with the response being transmitted on a HE-LTF portion of the NDP TB PPDU, e.g., as disclosed in conjunction with FIGS. 12, 14, and 15. HE station 504.3 may not transmit as it did not receive the information for NDP feedback report poll 1622. HE station 504.3 may have not have received an indication to transmit, and the DL PPDU 1612 may have a duration (e.g., 904) that indicates a length of a TXOP 1612 or a duration for HE station 504.3 to defer before trying to transmit.

Method 1600 may be performed by an apparatus of a HE station 504, an apparatus of an HE AP 502, a HE station 504, or a HE AP 502. Method 1600 may include one or more additional operations 1650. One or more of operations 1650 of method 1600 may not be performed.

Figure 17:
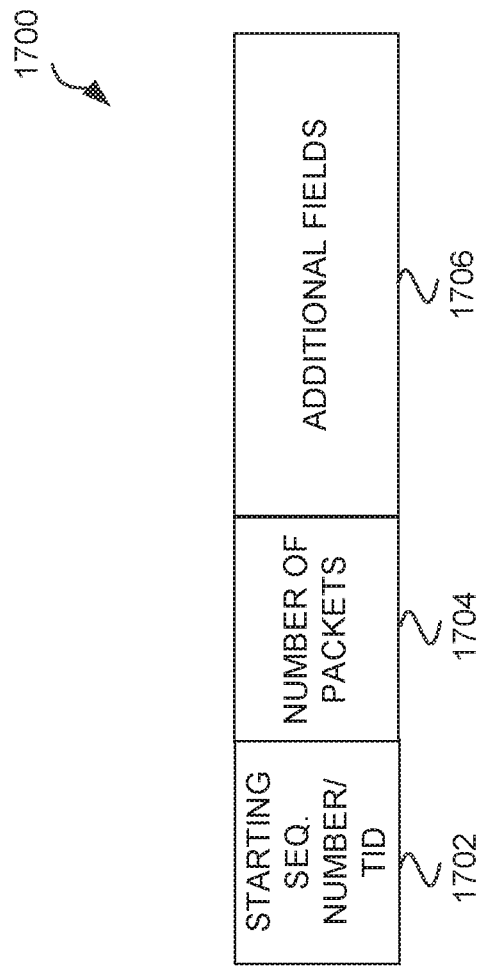
FIG. 17 illustrates A-control field NDP feedback report block acknowledgement (BA) trigger frame in accordance with some embodiments.

FIG. 17 illustrates A-control field NDP feedback report block acknowledgement (BA) trigger frame 1700 in accordance with some embodiments. The A-control field NDP feedback report BA trigger frame 1700 includes one or more of the following fields: starting sequence number and/or traffic identification (TID) 1702, number of packets 1704, and additional fields 1706. The starting sequence number and/or TID 1702 may be a starting sequence number of DL MPDUs that may have been transmitted to a HE station 504 and/or HE AP 502, or a TID 1702 of DL MPDUs. The number of packets 1704 may be a number of packets that were included in the DL MPDUs. The additional fields 1706 may be one or more of the fields disclosed in conjunction with FIG. 9, 10, 11, or 13. In some embodiments, the A-control field NDP feedback report BA trigger frame 1700 may be a NDP feedback report poll.

Figure 18:
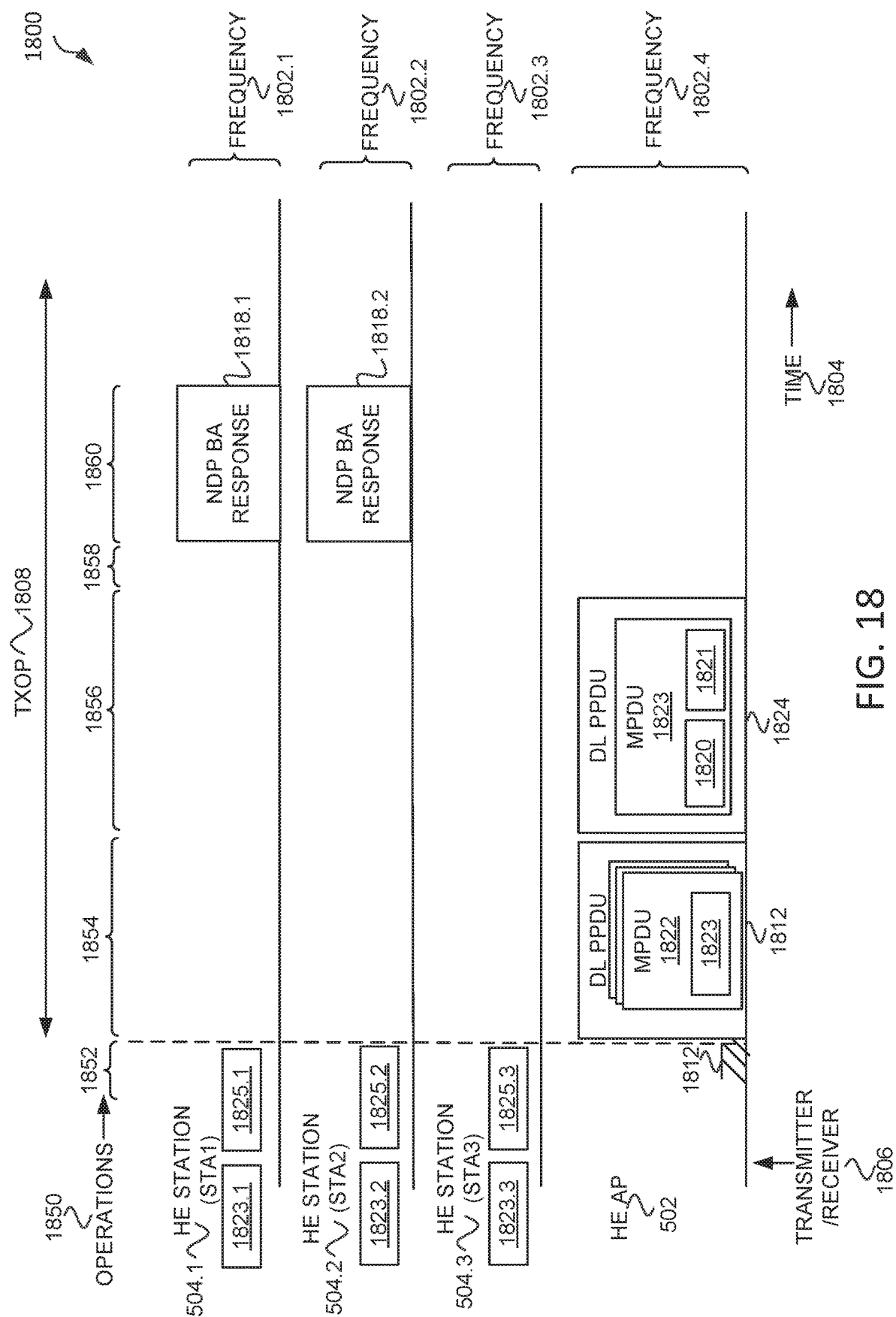
FIG. 18 illustrates a method for short BA with NDPs in accordance with some embodiments.

FIG. 18 illustrates a method 1800 for short BA with NDPs in accordance with some embodiments. Illustrated in FIG. 18 is frequency 1802, time 1804, transmitter/receiver 1806, TXOP 1808, responses 1818, DL PPDU 1812, DL PPDU 1824, and operations 1850.

The frequency 1802 may be a bandwidth, e.g., 20 MHz. The frequency 1814 may be the same or similar as frequency 814. Time 1804 may indicate the progression of time. Transmitter/receiver 1806 indicates the device that is transmitting and/or receiving, e.g., HE stations 504 and HE AP 502.

The HE stations 504 may include a MAC address 1823 and an AID 1825. The AID 1825 may be assigned to the HE station 504 by the HE AP 502 during association.

The method 1800 begins with the HE AP 502 transmitting DL PPDU 1812 to HE station 504.1 and HE station 504.2. The DL PPDU 1812 may be a trigger frame that includes a schedule that indicates to the HE station 504 how to decode the data, e.g., MPDUs 1822. The MPDUs 1822 may include sequence numbers 1823.

The method 1800 continues at operation 1856 with the HE AP 502 transmitting DL PPDU 1824. The DL PPDU 1824 may be a trigger frame. In some embodiments, the DL PPDU 1824 may be part of DL PPDU 1812, e.g., DL PPDU 1812 may be a DL MU trigger frame that includes information for the HE stations 504 to transmit a NDP BA response 1818. The DL PPDU may include a MPDU 1823 that includes information 1820 and destination address 1821. Information 1820 may be information for NDP feedback report poll (e.g., 1700) or A-control field NDP feedback report BA trigger frame (e.g., 1700), in accordance with some embodiments. Destination address 1821 may be a unicast address, multi-cast address, or broadcast address.

The method 1800 continues at operation 1858 with the HE stations 504 waiting a duration, e.g., SIFS, before transmitting. HE station 504.1 and HE station 504.2 decode the DL PPDU 1824 and determine that they contain MPDU 1823. HE station 504.1 and HE station 504.2 determine based on MPDU 1823 (e.g., destination address 1821) and/or information 1820 that they are scheduled to transmit NDP BA responses 1818, e.g., HE station 504.1 and HE station 504.2 may determine they are scheduled as disclosed in conjunction with FIG. 12, 14, 15, or 16.

HE station 504.1 and HE station 504.2 then determine the type of NDP BA response 1818 requested, e.g., as disclosed in conjunction with FIG. 12, 14, 15, or 16. For example, information 1820 may be a A-control field NDP feedback report BA trigger frame 1700 with a control ID 1302 that indicates a NDP feedback report BA trigger frame.

HE station 504.1 and HE station 504.2 then determine one or more RUs to transmit the NDP BA response 1818.1 and NDP BA response 1818.2, respectively, e.g., as disclosed in conjunction with FIG. 12, 14, 15, or 16. In some embodiments, HE station 504.1 and HE station 504.2 may determine RUs 808 based on how many MPDUs (e.g., number of packets 1704) to BA and a starting RU 808. HE station 504.1 and HE station 504.2 may have an RU to acknowledge each sequence number 1823 and/or an RU to acknowledge that all sequence numbers 1823 were received.

The method 1800 continues at operation 1860 with HE station 504.1 and HE station 504.2 transmitting NDP BA response 1818.1 and NDP BA response 1818.2, respectively. The NDP BA responses 1818 may be the same or similar as NDP feedback response 1618, 1518, 1418, and/or NDP 1230 and response 1210. The NDP BA responses 1818 may be transmitted on one or more RUs 808 as disclosed in conjunction with FIG. 8. In some embodiments, one RU 808 is used per MPDU that is being acknowledged, e.g., 12 tones. The NDP feedback responses 1818 may be NDP TB PPDUs with the response being transmitted on a HE-LTF portion of the NDP TB PPDU, e.g., as disclosed in conjunction with FIGS. 12, 14, 15, and 16. HE station 504.3 may not transmit as it was not scheduled by DL PPDU 1824. HE station 504.3 may have set a duration to defer based on the TXOP 1812, which may be a duration based on a duration (e.g., 904) of DL PPDU 1812. In some embodiments, there may be one MPDU 1923 per HE station 504 that is scheduled to respond with a NDP BA response 1818, e.g., the destination address 1821 may be a unicast address of a HE station 504, e.g., MAC address 1823.

Method 1800 may be performed by an apparatus of a HE station 504, an apparatus of an HE AP 502, a HE station 504, or a HE AP 502. Method 1800 may include one or more additional operations 1850. One or more of operations 1850 of method 1800 may not be performed.

Figure 19:
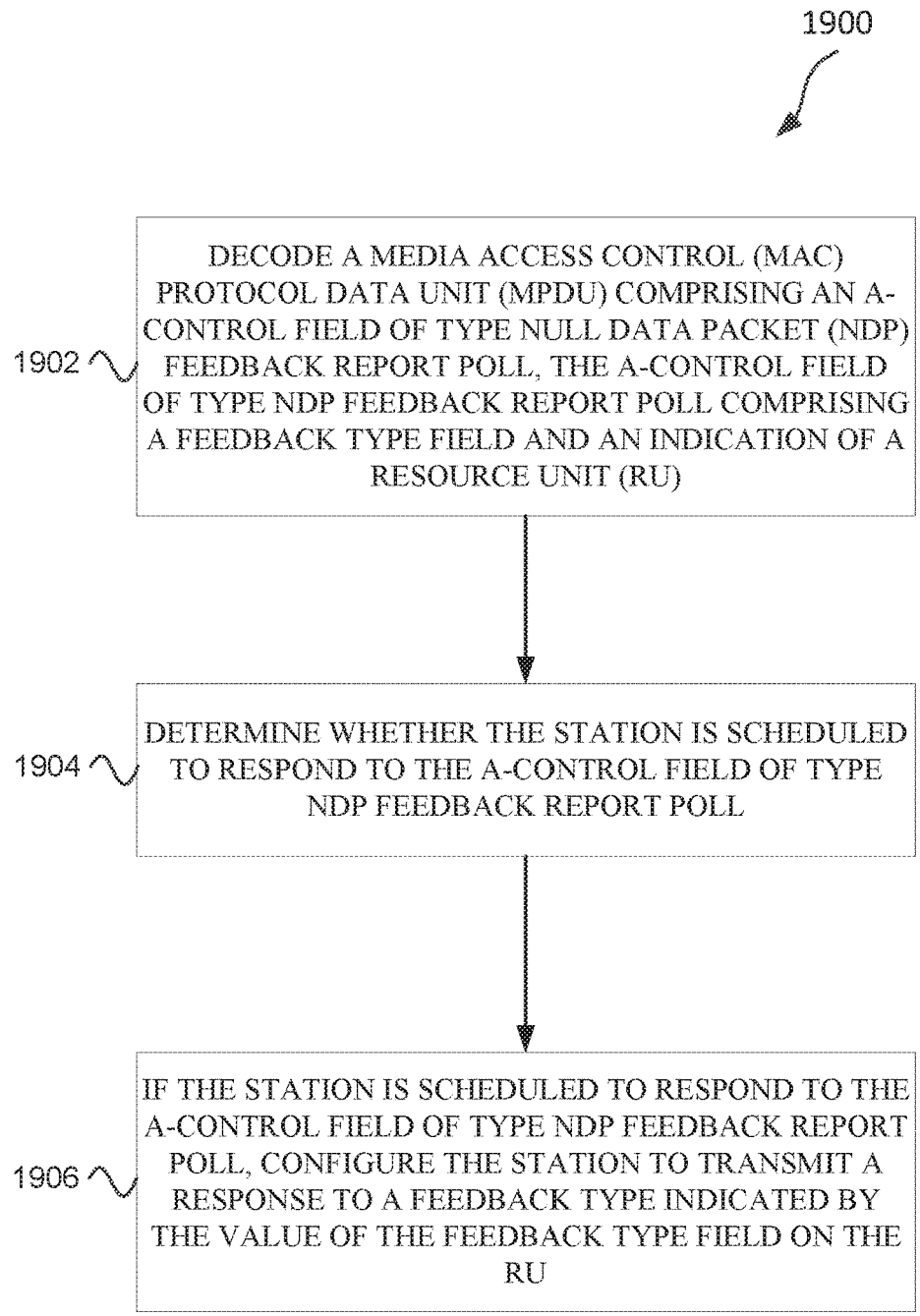
FIG. 19 illustrates a method of control field for NDP feedback report trigger in accordance with some embodiments.

FIG. 19 illustrates a method 1900 of control field for NDP feedback report trigger in accordance with some embodiments. The method 1900 begins at operation 1902 with decoding a MPDU comprising an A-control field of type NDP feedback report poll, the A-control field of type NDP feedback report poll comprising a feedback type field and an indication of a RU.

For example, HE stations 504 may decode MPDU 1422, MPDU 1522, or MPDU 1622.1. The MPDUs 1422.1 or 1422.2, MPDU 1522, or MPDU 1622.1. MPDUs 1422.1 and 1422.2 may include information for NDP feedback report poll 1420 which may be a A-control field of type NDP feedback report poll. Information for NDP feedback report poll 1420 may include feedback type field and an indication of a RU as disclosed in conjunction with FIG. 14. MPDUs 1522 may include information for NDP feedback report poll 1520 which may be a A-control field of type NDP feedback report poll. Information for NDP feedback report poll 1520 may include feedback type field and an indication of a RU as disclosed in conjunction with FIG. 15. MPDUs 1622 may include information for NDP feedback report poll 1620 which may be a A-control field of type NDP feedback report poll. Information for NDP feedback report poll 1620 may include feedback type field and an indication of a RU as disclosed in conjunction with FIG. 16.

The method 1900 may continue at operation 1904 with determining whether the station is scheduled to respond to the A-control field of type NDP feedback report poll. In some embodiments, HE stations 504 as disclosed in conjunction with FIG. 14 may determine whether they are scheduled based on whether a destination address 1421 of a MPDU 1422 (that includes information for NDP feedback report poll 1420) matches a MAC address 1423 of the HE station 504.

In some embodiments, HE stations 504 as disclosed in conjunction with FIG. 15 may determine whether they are scheduled based on an AID 1525 of the HE station 504, a number of HE stations scheduled, and a starting AID (e.g., 1102). The HE station 504 may be able to determine the number of HE stations scheduled and the starting AID from information for NDP feedback report poll 1520.

In some embodiments, HE stations 504 as disclosed in conjunction with FIG. 16 may determine whether they are scheduled based on an AID 1625 of the HE station 504, a number of HE stations scheduled, and a starting AID (e.g., 1102). The HE station 504 may be able to determine the number of HE stations scheduled and the starting AID from information for NDP feedback report poll 1620. In some embodiments, HE stations 504 as disclosed in conjunction with FIG. 16 may determine whether they are scheduled based on whether a destination address 1621 with a value of multi-cast of a MPDU 1622 that includes information for NDP feedback report poll 1620 matches a MAC address 1623 of the HE station 504.

The method 1900 may continue at operation 1906 with if the station is scheduled to respond to the A-control field of type NDP feedback report poll, configuring the station to transmit a response to a feedback type indicated by the value of the feedback type field on the RU.

In some embodiments, HE stations 504 as disclosed in conjunction with FIG. 14 may determine a feedback type based on the value of the feedback type field (e.g., 1104, 1310). The HE stations 504 may then determine a response to the feedback type (e.g, resource request) based on their situation.

Method 1900 may be performed by an apparatus of a HE station 504, an apparatus of an HE AP 502, a HE station 504, or a HE AP 502. Method 1900 may include one or more additional operations. One or more of operations may not be performed.

Figure 20:
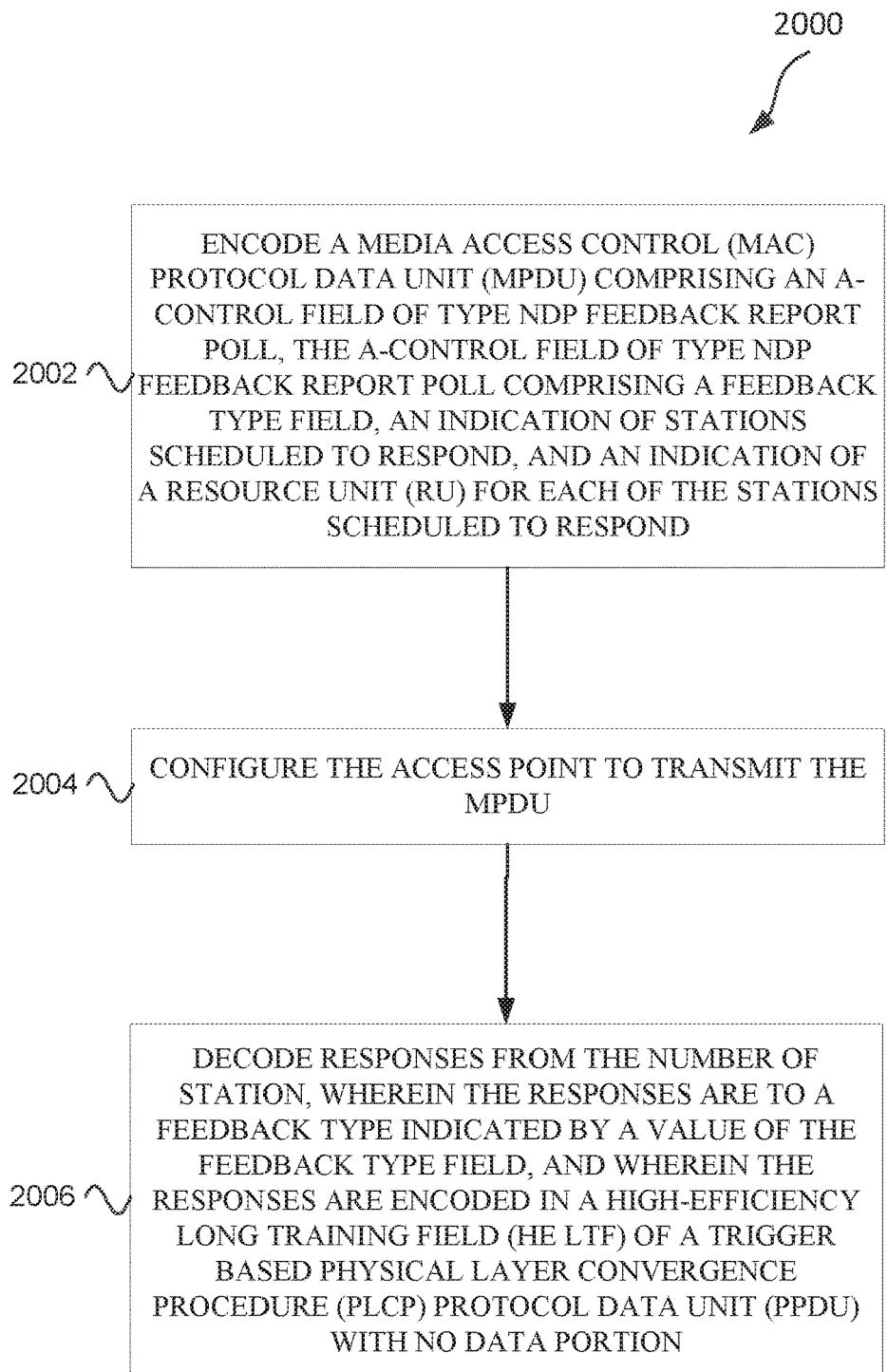
FIG. 20 illustrates a method of control field for NDP feedback report trigger in accordance with some embodiments.

FIG. 20 illustrates a method 2000 of control field for NDP feedback report trigger in accordance with some embodiments. The method 2000 begins at operation 2002 with encoding a MPDU comprising an A-control field of type NDP feedback report poll, the A-control field of type NDP feedback report poll comprising a feedback type field, an indication of stations scheduled to respond, and an indication of a RU for each of the stations scheduled to respond.

In some embodiments, HE AP 502 as disclosed in conjunction with FIG. 14 may encode DL PPDU 1412 comprising MPDUs 1422. The MPDUs 1422 may include information for NDP feedback report poll 1420. The information for NDP feedback report poll 1420 may include a feedback type field (e.g., feedback type field 1310, feedback type field 1104). The information for NDP feedback report poll 1420 and/or the MPDU 1422 may include an indication of stations scheduled as disclosed in conjunction with FIG. 14. The information for NDP feedback report poll 1420 may include an indication of a RU for each of the stations scheduled to respond as disclosed in conjunction with FIG. 14.

In some embodiments, HE AP 502 as disclosed in conjunction with FIG. 15 may encode DL PPDU 1512 comprising MPDUs 1522. The MPDUs 1522 may include information for NDP feedback report poll 1520. The information for NDP feedback report poll 1520 may include a feedback type field (e.g., feedback type field 1310, feedback type field 1104). The information for NDP feedback report poll 1520 and/or the MPDU 1522 may include an indication of stations scheduled as disclosed in conjunction with FIG. 15. The information for NDP feedback report poll 1520 may include an indication of a RU for each of the stations scheduled to respond as disclosed in conjunction with FIG. 15.

In some embodiments, HE AP 502 as disclosed in conjunction with FIG. 16 may encode DL PPDU 1612 comprising MPDUs 1622. The MPDUs 1622 may include information for NDP feedback report poll 1620. The information for NDP feedback report poll 1620 may include a feedback type field (e.g., feedback type field 1310, feedback type field 1104). The information for NDP feedback report poll 1620 and/or the MPDU 1622 may include an indication of stations scheduled as disclosed in conjunction with FIG. 16. The information for NDP feedback report poll 1620 may include an indication of a RU for each of the stations scheduled to respond as disclosed in conjunction with FIG. 16.

The method 2000 continues with operation 2004 with configuring the access point to transmit the MPDU. For example, an apparatus of HE AP 502 of FIGS. 14, 15, and 16 may configure the HE AP 502 to transmit the MPDUs 1422.

The method 2000 continues with decoding responses from stations scheduled to respond, where the responses are to a feedback type indicated by a value of the feedback type field, and wherein the responses are encoded in a HE LTF of a TB PPDU with no data portion (e.g., a NDP). For example, HE station 504 may decode NDP feedback responses 1418 as disclosed in conjunction with FIG. 14. For example, HE station 504 may decode NDP feedback responses 1518 as disclosed in conjunction with FIG. 15. For example, HE station 504 may decode NDP feedback responses 1618 as disclosed in conjunction with FIG. 16.

Method 2000 may be performed by an apparatus of a HE station 504, an apparatus of an HE AP 502, a HE station 504, or a HE AP 502. Method 2000 may include one or more additional operations. One or more of operations may not be performed.

Some embodiments provide a technical solution to a problem of how to solicit feedback from a large number of stations at the same time. The technical solution is to provide RU (e.g., 808) that are small and to encode response directly on the tones by transmitting energy or not transmitting energy. Some embodiments, provide a technical solution to a problem of how to address a large number of stations for a large number of responses in a concise way. The technical solution is to schedule stations based on a range of AIDs and to allow stations to determine whether they are scheduled and an RU to respond on based on their AID, a starting AID, and a number of stations that are scheduled (which may be determined based on a BW and number of spatial streams.) Some embodiments provide a technical solution to the problem of how to receive BAs. The technical solution is to use the technical solutions provided herein and assign a single RU to a sequence number.

The following examples pertain to further embodiments. Example 1 is an apparatus of a station, the apparatus comprising: memory; and processing circuitry coupled to the memory, the processing circuitry configured to: decode a media access control (MAC) protocol data unit (MPDU) comprising an A-control field of type null data packet (NDP) feedback report poll, the A-control field of type NDP feedback report poll comprising a feedback type field and an indication of a resource unit (RU); determine whether the station is scheduled to respond to the A-control field of type NDP feedback report poll; and if the station is scheduled to respond to the A-control field of type NDP feedback report poll, configure the station to transmit a response to a feedback type indicated by a value of the feedback type field on the RU.

In Example 2, the subject matter of Example 1 optionally includes wherein the RU comprises a number of tones on which to transmit the response to the feedback type, wherein the number of tones comprises a first set of tones and a second set of tones, and wherein transmitting energy on the first set of tones and not transmitting energy on the second set of tones indicates a first response, and wherein not transmitting energy on the first set of tones and transmitting energy on the second set of tones indicates a second response to the feedback type.

In Example 3, the subject matter of Example 2 optionally includes pts per symbol. In Example 4, the subject matter of any one or more of Examples 1-3 optionally include wherein the MPDU further comprises a destination address, and wherein a value of the destination address indicates the MPDU is addressed to the station, and wherein a value of the destination address is a media access control (MAC) address of the station, or the value of the destination address is a multi-cast address that includes the MAC address of the station, and wherein the processing circuitry is further configured to: determine the station is scheduled to respond to the A-control field of type NDP feedback report poll based on the value of the destination address indicating the MPDU is addressed to the station.

In Example 5, the subject matter of Example 4 optionally includes wherein the A-control field of type NDP feedback report poll further comprises a RU allocation or tone set offset field, a spatial stream allocation field, and a bandwidth field, and wherein the processing circuitry is further configured to: determine the RU based on a value of the RU allocation or tone set offset field, a value of the bandwidth field, and a value of spatial stream allocation field.

In Example 6, the subject matter of any one or more of Examples 1-5 optionally include wherein the MPDU further comprises a destination address, and wherein a value of the destination address is a broadcast address.

In Example 7, the subject matter of Example 6 optionally includes wherein the A-control field of type NDP feedback report poll further comprises a starting association identification (AID), and wherein the processing circuitry is further configured to: if an AID of the station is greater than or equal to a value of the starting AID field and less than the value of the starting AID plus a number of stations that are scheduled, configure the station to transmit the response to the feedback type indicated by the value of the feedback type field on the RU.

In Example 8, the subject matter of any one or more of Examples 6-7 optionally include the A-control field of type NDP feedback report poll further comprises a bandwidth field, and wherein the processing circuitry is configured to: determine the number of stations that are scheduled to respond to the A-control field of type NDP feedback report poll based on the value of the bandwidth field.

In Example 9, the subject matter of any one or more of Examples 1-8 optionally include wherein the A-control field of type NDP feedback report poll further comprises one or more fields from the following group of fields: a starting association identification (AID) field, a spatial stream allocation field, a RU allocation or tone set field, a control identification, a target received signal strength indication (RSSI) field, a feedback size field, a bandwidth field, and a number of tones per high-efficiency (HE) long training field (HE-LTF) field.

In Example 10, the subject matter of any one or more of Examples 1-9 optionally include wherein the processing circuitry is configured to: encode the response to the feedback type indicated by the value of the feedback type field in a high efficiency long training field (HE-LTF) of a trigger based physical layer convergence procedure (PLCP) protocol data unit (PPDU) with no data portion.

In Example 11, the subject matter of any one or more of Examples 1-10 optionally include wherein the A-control field of type NDP feedback report poll further comprises a bandwidth field, a spatial stream allocation field, and a starting association identification (AID), and wherein processing circuitry is further configured to: determine based on an association identification of the station, a value of the bandwidth field, a value of the spatial stream allocation field, and a value of the starting AID, the RU comprising a number of tones on which to transmit the response to the feedback type.

In Example 12, the subject matter of any one or more of Examples 1-11 optionally include access point.

In Example 13, the subject matter of any one or more of Examples 1-12 optionally include transceiver circuitry coupled to the processing circuitry; and, one or more antennas coupled to the transceiver circuitry.

In Example 14, the subject matter of any one or more of Examples 1-13 optionally include wherein the station is configured to operate in a wireless local area network (WLAN).

Example 15 is a non-transitory computer-readable storage medium that stores instructions for execution by one or more processors, the instructions to configure the one or more processors to cause a station to: decode a media access control (MAC) protocol data unit (MPDU) comprising an A-control field of type NDP feedback report poll, the A-control field of type NDP feedback report poll comprising a feedback type field and an indication of a resource unit (RU); determine whether the station is scheduled to respond to the A-control field of type NDP feedback report poll; and if the station is scheduled to respond to the A-control field of type NDP feedback report poll, configure the station to transmit a response to a feedback type indicated by the value of the feedback type field on the RU.

In Example 16, the subject matter of Example 15 optionally includes wherein the RU comprises a number of tones on which to transmit the response to the feedback type, wherein the number of tones comprises a first set of tones and a second set of tones, and wherein transmitting energy on the first set of tones and not transmitting energy on the second set of tones indicates a first response, and wherein not transmitting energy on the first set of tones and transmitting energy on the second set of tones indicates a second response.

In Example 17, the subject matter of any one or more of Examples 15-16 optionally include μs per symbol. In Example 18, the subject matter of any one or more of Examples 15-17 optionally include wherein the MPDU further comprises a destination address, and wherein a value of the destination address indicates the MPDU is addressed to the station, and wherein a value of the destination address is a media access control (MAC) address of the station, or the value of the destination address is a multi-cast address that includes the MAC address of the station, and wherein the instructions further configure the one or more processors to cause the station to: determine the station is scheduled to respond to the A-control field of type NDP feedback report poll based on the value of the destination address indicating the MPDU is addressed to the station.

Example 19 is a method performed by an apparatus of a station, the method comprising: decoding a media access control (MAC) protocol data unit (MPDU) comprising an A-control field of type NDP feedback report poll, the A-control field of type NDP feedback report poll comprising a feedback type field and an indication of a resource unit (RU); determining whether the station is scheduled to respond to the A-control field of type NDP feedback report poll; and if the station is scheduled to respond to the A-control field of type NDP feedback report poll, configuring the station to transmit a response to a feedback type indicated by the value of the feedback type field on the RU.

In Example 20, the subject matter of Example 19 optionally includes wherein the RU comprises a number of tones on which to transmit the response to the feedback type, wherein the number of tones comprises a first set of tones and a second set of tones, and wherein transmitting energy on the first set of tones and not transmitting energy on the second set of tones indicates a first response, and wherein not transmitting energy on the first set of tones and transmitting energy on the second set of tones indicates a second response.

Example 21 is an apparatus of an access point, the apparatus comprising: memory; and processing circuitry coupled to the memory, the processing circuitry configured to: encode a media access control (MAC) protocol data unit (MPDU) comprising an A-control field of type NDP feedback report poll, the A-control field of type NDP feedback report poll comprising a feedback type field, an indication of stations scheduled to respond, and an indication of a resource unit (RU) for each of the stations scheduled to respond; configure the access point to transmit the MPDU; and decode responses from stations scheduled to respond, wherein the responses are to a feedback type indicated by a value of the feedback type field, and wherein the responses are encoded in a high-efficiency long training field (HE LTF) of a trigger based physical layer convergence procedure (PLCP) protocol data unit (PPDU) with no data portion.

In Example 22, the subject matter of Example 21 optionally includes wherein the MPDU comprises a destination address with a value of broadcast, and wherein the A-control field of type NDP feedback report poll further comprises a starting association identification (AID) field, a spatial stream allocation field, and a bandwidth field, and wherein a value of the bandwidth field and a value of the spatial stream allocation field indicate a number of stations, and wherein the number of stations and a value of the starting AID field indicate the stations scheduled to respond.

In Example 23, the subject matter of any one or more of Examples 21-22 optionally include wherein the MPDU comprises a destination address with a value of multi-cast, and wherein the value of multi-cast indicates the stations scheduled to respond.

In Example 24, the subject matter of any one or more of Examples 21-23 optionally include wherein the processing circuitry is further configured to: encode a plurality of MPDUs, each comprising an A-control field of type NDP feedback report poll with a destination address with a value of a media access control (MAC) address of a station of the stations scheduled to respond.

In Example 25, the subject matter of any one or more of Examples 21-24 optionally include transceiver circuitry coupled to the processing circuitry; and, one or more antennas coupled to the transceiver circuitry.

Example 26 is a non-transitory computer-readable storage medium that stores instructions for execution by one or more processors, the instructions to configure the one or more processors to cause an access point to: encode a media access control (MAC) protocol data unit (MPDU) comprising an A-control field of type NDP feedback report poll, the A-control field of type NDP feedback report poll comprising a feedback type field, an indication of stations scheduled to respond, and an indication of a resource unit (RU) for each of the stations scheduled to respond; configure the access point to transmit the MPDU; and decode responses from stations scheduled to respond, wherein the responses are to a feedback type indicated by a value of the feedback type field, and wherein the responses are encoded in a high-efficiency long training field (HE LTF) of a trigger based physical layer convergence procedure (PLCP) protocol data unit (PPDU) with no data portion.

In Example 27, the subject matter of Example 26 optionally includes wherein the MPDU comprises a destination address with a value of broadcast, and wherein the A-control field of type NDP feedback report poll further comprises a starting association identification (AID) field, a spatial stream allocation field, and a bandwidth field, and wherein a value of the bandwidth field and a value of the spatial stream allocation field indicate a number of stations, and wherein the number of stations and a value of the starting AID field indicate the stations scheduled to respond.

In Example 28, the subject matter of any one or more of Examples 26-27 optionally include wherein the MPDU comprises a destination address with a value of multi-cast, and wherein the value of multi-cast indicates the stations scheduled to respond.

In Example 29, the subject matter of any one or more of Examples 26-28 optionally include wherein the instructions further configure the one or more processors to cause the access point to: encode a plurality of MPDUs, each comprising an A-control field of type NDP feedback report poll with a destination address with a value of a media access control (MAC) address of a station of the stations scheduled to respond.

Example 30 is a method performed by an access point, the method comprising: encoding a media access control (MAC) protocol data unit (MPDU) comprising an A-control field of type NDP feedback report poll, the A-control field of type NDP feedback report poll comprising a feedback type field, an indication of stations scheduled to respond, and an indication of a resource unit (RU) for each of the stations scheduled to respond; configuring the access point to transmit the MPDU; and decoding responses from stations scheduled to respond, wherein the responses are to a feedback type indicated by a value of the feedback type field, and wherein the responses are encoded in a high-efficiency long training field (HE LTF) of a trigger based physical layer convergence procedure (PLCP) protocol data unit (PPDU) with no data portion.

In Example 31, the subject matter of Example 30 optionally includes wherein the MPDU comprises a destination address with a value of broadcast, and wherein the A-control field of type NDP feedback report poll further comprises a starting association identification (AID) field, a spatial stream allocation field, and a bandwidth field, and wherein a value of the bandwidth field and a value of the spatial stream allocation field indicate a number of stations, and wherein the number of stations and a value of the starting AID field indicate the stations scheduled to respond.

In Example 32, the subject matter of any one or more of Examples 30-31 optionally include wherein the MPDU comprises a destination address with a value of multi-cast, and wherein the value of multi-cast indicates the stations scheduled to respond.

In Example 33, the subject matter of any one or more of Examples 30-32 optionally include the method further comprising: encoding a plurality of MPDUs, each comprising an A-control field of type NDP feedback report poll with a destination address with a value of a media access control (MAC) address of a station of the stations scheduled to respond.

Example 34 is an apparatus of an access point, the apparatus comprising: means for encoding a media access control (MAC) protocol data unit (MPDU) comprising an A-control field of type NDP feedback report poll, the A-control field of type NDP feedback report poll comprising a feedback type field, an indication of stations scheduled to respond, and an indication of a resource unit (RU) for each of the stations scheduled to respond; means for configuring the access point to transmit the MPDU; and means for decoding responses from stations scheduled to respond, wherein the responses are to a feedback type indicated by a value of the feedback type field, and wherein the responses are encoded in a high-efficiency long training field (HE LTF) of a trigger based physical layer convergence procedure (PLCP) protocol data unit (PPDU) with no data portion.

In Example 35, the subject matter of Example 34 optionally includes wherein the MPDU comprises a destination address with a value of broadcast, and wherein the A-control field of type NDP feedback report poll further comprises a starting association identification (AID) field, a spatial stream allocation field, and a bandwidth field, and wherein a value of the bandwidth field and a value of the spatial stream allocation field indicate a number of stations, and wherein the number of stations and a value of the starting AID field indicate the stations scheduled to respond.

In Example 36, the subject matter of any one or more of Examples 34-35 optionally include wherein the MPDU comprises a destination address with a value of multi-cast, and wherein the value of multi-cast indicates the stations scheduled to respond.

In Example 37, the subject matter of any one or more of Examples 34-36 optionally include the apparatus further comprising: means for encoding a plurality of MPDUs, each comprising an A-control field of type NDP feedback report poll with a destination address with a value of a media access control (MAC) address of a station of the stations scheduled to respond.

Example 38 is an apparatus of a station, the apparatus comprising: means for decoding a media access control (MAC) protocol data unit (MPDU) comprising an A-control field of type null data packet (NDP) feedback report poll, the A-control field of type NDP feedback report poll comprising a feedback type field and an indication of a resource unit (RU); means for determining whether the station is scheduled to respond to the A-control field of type NDP feedback report poll; and if the station is scheduled to respond to the A-control field of type NDP feedback report poll, means for configuring the station to transmit a response to a feedback type indicated by a value of the feedback type field on the RU.

In Example 39, the subject matter of Example 38 optionally includes wherein the RU comprises a number of tones on which to transmit the response to the feedback type, wherein the number of tones comprises a first set of tones and a second set of tones, and wherein transmitting energy on the first set of tones and not transmitting energy on the second set of tones indicates a first response, and wherein not transmitting energy on the first set of tones and transmitting energy on the second set of tones indicates a second response to the feedback type.

In Example 40, the subject matter of any one or more of Examples 38-39 optionally include μs per symbol. In Example 41, the subject matter of any one or more of Examples 1-40 optionally include wherein the MPDU further comprises a destination address, and wherein a value of the destination address indicates the MPDU is addressed to the station, and wherein a value of the destination address is a media access control (MAC) address of the station, or the value of the destination address is a multi-cast address that includes the MAC address of the station, and further comprising: means for determining the station is scheduled to respond to the A-control field of type NDP feedback report poll based on the value of the destination address indicating the MPDU is addressed to the station.

In Example 42, the subject matter of Example 41 optionally includes wherein the A-control field of type NDP feedback report poll further comprises a RU allocation or tone set offset field, a spatial stream allocation field, and a bandwidth field, and wherein further comprising: means for determining the RU based on a value of the RU allocation or tone set offset field, a value of the bandwidth field, and a value of spatial stream allocation field.

In Example 43, the subject matter of any one or more of Examples 38-42 optionally include wherein the MPDU further comprises a destination address, and wherein a value of the destination address is a broadcast address.

In Example 44, the subject matter of Example 43 optionally includes wherein the A-control field of type NDP feedback report poll further comprises a starting association identification (AID), and further comprising: if an AID of the station is greater than or equal to a value of the starting AID field and less than the value of the starting AID plus a number of stations that are scheduled, means for configuring the station to transmit the response to the feedback type indicated by the value of the feedback type field on the RU.

In Example 45, the subject matter of Example 44 optionally includes the A-control field of type NDP feedback report poll further comprises a bandwidth field, and further comprising: means for determining the number of stations that are scheduled to respond to the A-control field of type NDP feedback report poll based on the value of the bandwidth field.

In Example 46, the subject matter of any one or more of Examples 38-45 optionally include wherein the A-control field of type NDP feedback report poll further comprises one or more fields from the following group of fields: a starting association identification (AID) field, a spatial stream allocation field, a RU allocation or tone set field, a control identification, a target received signal strength indication (RSSI) field, a feedback size field, a bandwidth field, and a number of tones per high-efficiency (HE) long training field (HE-LTF) field.

In Example 47, the subject matter of any one or more of Examples 38-46 optionally include means for encoding the response to the feedback type indicated by the value of the feedback type field in a high efficiency long training field (HE-LTF) of a trigger based physical layer convergence procedure (PLCP) protocol data unit (PPDU) with no data portion.

In Example 48, the subject matter of any one or more of Examples 38-47 optionally include wherein the A-control field of type NDP feedback report poll further comprises a bandwidth field, a spatial stream allocation field, and a starting association identification (AID), and further comprising: means for determining based on an association identification of the station, a value of the bandwidth field, a value of the spatial stream allocation field, and a value of the starting AID, the RU comprising a number of tones on which to transmit the response to the feedback type.

In Example 49, the subject matter of any one or more of Examples 38-48 optionally include access point. In Example 50, the subject matter of any one or more of Examples 38-49 optionally include means for processing radio frequency signals coupled to means for storing and retrieving data; and, means for transmitting and receiving radio frequency signals coupled to the means for processing radio frequency signals.

In Example 51, the subject matter of any one or more of Examples 38-50 optionally include means for operating in a wireless local area network (WLAN).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station, the apparatus comprising:
memory; and
   processing circuitry coupled to the memory, the processing circuitry configured to:
   decode a media access control (MAC) protocol data unit (MPDU) comprising an A-control field of type null data packet (NDP) feedback report poll, the A-control field of type NDP feedback report poll comprising a feedback type field, a bandwidth field, a spatial stream allocation field, and a starting association identification (AID);
   determine whether the station is scheduled to respond to the A-control field of type NDP feedback report poll;
   if the station is scheduled to respond to the A-control field of type NDP feedback report poll, determine based on an association identification of the station a value of the bandwidth field, a value of the spatial stream allocation field, and a value of the starting AID, a resource unit (RU) comprising a number of tones on which to transmit the response to the feedback type, and configure the station to transmit a response to a feedback type indicated by a value of the feedback type field on the RU.

2. The apparatus of claim 1, wherein the number of tones comprises a first set of tones and a second set of tones, and wherein transmitting energy on the first set of tones and not transmitting energy on the second set of tones indicates a first response, and wherein not transmitting energy on the first set of tones and transmitting energy on the second set of tones indicates a second response to the feedback type.

3. The apparatus of claim 2, wherein the resource unit is part of a high efficiency long training field (HE-LTF) comprising two symbols with a 16 µs per symbol.

4. The apparatus of claim 1, wherein the MPDU further comprises a destination address, and wherein a value of the destination address indicates the MPDU is addressed to the station, and wherein a value of the destination address is a media access control (MAC) address of the station, or the value of the destination address is a multi-cast address that includes the MAC address of the station, and wherein the processing circuitry is further configured to:
   determine the station is scheduled to respond to the A-control field of type NDP feedback report poll based on the value of the destination address indicating the MPDU is addressed to the station.

5. The apparatus of claim 1, wherein the MPDU further comprises a destination address, and wherein a value of the destination address is a broadcast address.

6. The apparatus of claim 5, wherein the A-control field of type NDP feedback report poll further comprises a starting association identification (AID), and wherein the processing circuitry is further configured to:
   if an AID of the station is greater than or equal to a value of the starting AID field and less than the value of the starting AID plus a number of stations that are scheduled, configure the station to transmit the response to the feedback type indicated by the value of the feedback type field on the RU.

7. The apparatus of claim 6, the A-control field of type NDP feedback report poll further comprises a bandwidth field, and wherein the processing circuitry is configured to:
determine the number of stations that are scheduled to respond to the A-control field of type NDP feedback report poll based on the value of the bandwidth field.

8. The apparatus of claim 1, wherein the A-control field of type NDP feedback report poll further comprises one or more fields from the following group of fields: a starting association identification (AID) field, a spatial stream allocation field, a RU allocation or tone set field, a control identification, a target received signal strength indication (RSSI) field, a feedback size field, a bandwidth field, and a number of tones per high-efficiency (HE) long training field (HE-LTF) field.

9. The apparatus of claim 1, wherein the processing circuitry is configured to:
encode the response to the feedback type indicated by the value of the feedback type field in a high efficiency long training field (HE-LTF) of a trigger based physical layer convergence procedure (PLCP) protocol data unit (PPDU) with no data portion.

10. The apparatus of claim 1, wherein the station is one from the following group: an Institute of Electrical and Electronic Engineers (IEEE) 802.11 ax access point, an IEEE 802.11ax station, an IEEE 802.11 station, an IEEE 802.11ax non-AP STA, and an IEEE 802.11 access point.

11. The apparatus of claim 1, further comprising transceiver circuitry coupled to the processing circuitry; and, one or more antennas coupled to the transceiver circuitry.

12. The apparatus of claim 1, wherein the station is configured to operate in a wireless local area network (WEAN).

13. A non-transitory computer-readable storage medium that stores instructions for execution by one or more processors, the instructions to configure the one or more processors to cause a station to:
decode a media access control (MAC) protocol data unit (MPDU) comprising an A-control field of type null data packet (NDP) feedback report poll, the A-control field of type NDP feedback report poll comprising a feedback type field, a bandwidth field, a spatial stream allocation field, and a starting association identification (AID);
determine whether the station is scheduled to respond to the A-control field of type NDP feedback report poll;
if the station is scheduled to respond to the A-control field of type NDP feedback report poll, determine based on an association identification of the station, a value of the bandwidth field, a value of the spatial stream allocation field, and a value of the starting AID, a resource unit (RU) comprising a number of tones on which to transmit the response to the feedback type, and configure the station to transmit a response to a feedback type indicated by a value of the feedback type field on the RU.

14. The non-transitory computer-readable storage medium of claim 13, wherein the number of tones comprises a first set of tones and a second set of tones, and wherein transmitting energy on the first set of tones and not transmitting energy on the second set of tones indicates a first response, and wherein not transmitting energy on the first set of tones and transmitting energy on the second set of tones indicates a second response.

15. The non-transitory computer-readable storage medium of claim 13, wherein the resource unit is part of a high efficiency long training field (HE-LTF) comprising two symbols with a 16 μs per symbol.

16. The non-transitory computer-readable storage medium of claim 13, wherein the MPDU further comprises a destination address, and wherein a value of the destination address indicates the MPDU is addressed to the station, and wherein a value of the destination address is a media access control (MAC) address of the station, or the value of the destination address is a multi-cast address that includes the MAC address of the station, and wherein the instructions further configure the one or more processors to cause the station to:
determine the station is scheduled to respond to the A-control field of type NDP feedback report poll based on the value of the destination address indicating the MPDU is addressed to the station.

17. A method performed by an apparatus of a station, the method comprising:
decoding a media access control (MAC) protocol data unit (MPDU) comprising an A-control field of type null data packet (NDP) feedback report poll, the A-control field of type NDP feedback report poll comprising a feedback type field, a bandwidth field, a spatial stream allocation field, and a starting association identification (AID);
determining whether the station is scheduled to respond to the A-control field of type NDP feedback report poll;
if the station is scheduled to respond to the A-control field of type NDP feedback report poll, determining based on an association identification of the station, a value of the bandwidth field, a value of the spatial stream allocation field, and a value of the starting AID, a resource unit (RU) comprising a number of tones on which to transmit the response to the feedback type, and configuring the station to transmit a response to a feedback type indicated by a value of the feedback type field on the RU.

18. The method of claim 17, wherein the number of tones comprises a first set of tones and a second set of tones, and wherein transmitting energy on the first set of tones and not transmitting energy on the second set of tones indicates a first response, and wherein not transmitting energy on the first set of tones and transmitting energy on the second set of tones indicates a second response.

19. An apparatus of an access point, the apparatus comprising:
memory; and processing circuitry coupled to the memory, the processing circuitry configured to:
encode a media access control (MAC) protocol data unit (MPDU) comprising an A-control field of type NDP feedback report poll, the A-control field of type NDP feedback report poll comprising a feedback type field, an indication of stations scheduled to respond, and an indication of a resource unit (RU) for each of the stations scheduled to respond, wherein the MPDU comprises a destination address with a value of broadcast, and wherein the A-control field of type NDP feedback report poll further comprises a starting association identification (AID) field, a spatial stream allocation field, and a bandwidth field, and wherein a value of the bandwidth field and a value of the spatial stream allocation field indicate a number of stations, and wherein the number of stations and a value of the starting AID field indicate the stations scheduled to respond;

configure the access point to transmit the MPDU; and
decode responses from the stations scheduled to respond, wherein the responses are to a feedback type indicated by a value of the feedback type field, and wherein the responses are encoded in a high-efficiency long training field (HE LTF) of a trigger based physical layer convergence procedure (PLCP) protocol data unit (PPDU) with no data portion.

20. The apparatus of claim 19, wherein the MPDU comprises a destination address with a value of multi-cast, and wherein the value of multi-cast indicates the stations scheduled to respond.

21. The apparatus of claim 19, wherein the processing circuitry is further configured to:
encode a plurality of MPDUs, each comprising an A-control field of type NDP feedback report poll with a destination address with a value of a media access control (MAC) address of a station of the stations scheduled to respond.

22. The apparatus of claim 19, further comprising transceiver circuitry coupled to the processing circuitry; and, one or more antennas coupled to the transceiver circuitry.

* * * * *

UNITED STATES PATENT AND TRADEMARK OFFICE
CERTIFICATE OF CORRECTION

PATENT NO. : 11,057,254 B2  
APPLICATION NO. : 16/474145  
DATED : July 6, 2021  
INVENTOR(S) : Cariou et al.

Page 1 of 1

It is certified that error appears in the above-identified patent and that said Letters Patent is hereby corrected as shown below:

In the Claims

In Column 40, Line 25, in Claim 1, after "station", insert --,--

In Column 41, Line 34, in Claim 12, delete "(WEAN)." and insert --(WLAN).-- therefor Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*